US012570107B2

(12) United States Patent
Yagi et al.

(10) Patent No.: US 12,570,107 B2
(45) Date of Patent: Mar. 10, 2026

(54) TIRE

(71) Applicant: Sumitomo Rubber Industries, Ltd., Kobe (JP)

(72) Inventors: Kenta Yagi, Kobe (JP); Toshiki Horiguchi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 88 days.

(21) Appl. No.: 18/621,271

(22) Filed: Mar. 29, 2024

(65) Prior Publication Data

US 2024/0343071 A1 Oct. 17, 2024

(30) Foreign Application Priority Data

Apr. 14, 2023 (JP) ................................. 2023-066326
Apr. 14, 2023 (JP) ................................. 2023-066328

(51) Int. Cl.
*B60C 11/04* (2006.01)
*B60C 11/03* (2006.01)
(52) U.S. Cl.
CPC ........ *B60C 11/042* (2013.01); *B60C 11/0304* (2013.01); *B60C 2011/0346* (2013.01); *B60C 2011/0353* (2013.01); *B60C 2011/0355* (2013.01)
(58) Field of Classification Search
CPC ... B60C 11/03; B60C 11/042; B60C 11/0304; B60C 2011/0339; B60C 2011/0341; B60C 2011/0346
See application file for complete search history.

(56) References Cited

U.S. PATENT DOCUMENTS

2019/0329599 A1 10/2019 Horiguchi et al.

FOREIGN PATENT DOCUMENTS

| JP | H07228108 A | * | 8/1995 | ......... B60C 11/1263 |
| JP | 2019-189106 A | | 10/2019 | |
| JP | 2022-191142 A | | 12/2022 | |

* cited by examiner

*Primary Examiner* — Cedrick S Williams
(74) *Attorney, Agent, or Firm* — Birch, Stewart, Kolasch & Birch, LLP

(57) ABSTRACT

The tire includes a tread portion whose position when mounted on a vehicle is specified. The tread portion includes a first tread edge, a second tread edge, a plurality of circumferential grooves, and five land regions. The circumferential grooves include a first shoulder circumferential groove, a first crown circumferential groove, a second shoulder circumferential groove, and a second crown circumferential groove. The second shoulder circumferential groove has groove walls each configured as a zigzag surface. The second crown circumferential groove has groove walls each configured as a flat surface. Each of the groove walls of the second shoulder circumferential groove includes first surfaces and second surfaces arranged alternately. Each of the groove walls of the second shoulder circumferential groove includes has 2 to 4 first surfaces between each two of axial grooves adjacent to each other in a tire circumferential direction.

19 Claims, 16 Drawing Sheets

TIRE

RELATED APPLICATIONS

This application claims the benefit of foreign priority to Japanese Patent Applications No. JP2023-066328 and JP2023-066326, both filed Apr. 14, 2023, which are incorporated by reference in their entirety.

FIELD OF THE INVENTION

The present disclosure relates to a tire.

BACKGROUND OF THE INVENTION

Japanese Unexamined Patent Application Publication No. 2019-189106 has proposed a tire having a crown land region provided with a plurality of crown sipes. By improving the crown sipes, the tire improves steering stability on a dry road surface and on-snow performance in a good balance.

SUMMARY OF THE INVENTION

In recent years, a variety of all-season tires (also referred to as all-weather tires) capable of running on showy road surfaces in addition to dry and wet road surfaces have been proposed. In this type of tire, the tread portion thereof is provided with a lot of edge components in order to ensure running performance on a snowy road surface. However, such tires have room for improvement in terms of the steering stability on a dry road surface.

The present disclosure was made in view of the above, and a primary object thereof is to provide a tire capable of improving the steering stability on a dry road surface while maintaining the running performance on a snowy road surface.

The present disclosure is a tire including a tread portion,
wherein the tread portion position for mounting the tire on a vehicle is specified regarding inner and outer sides of the tread portion with respect to the vehicle,
wherein the tread portion includes:
a first tread edge specified to be positioned on the outer side of the vehicle;
a second tread edge specified to be positioned on the inner side of the vehicle; and
a plurality of circumferential grooves each extending continuously in a tire circumferential direction,
wherein the circumferential grooves include:
a first shoulder circumferential groove positioned closest to the first tread edge among the circumferential grooves;
a first crown circumferential groove positioned between the first shoulder circumferential groove and a tire equator;
a second shoulder circumferential groove positioned closest to the second tread edge among the circumferential grooves; and
a second crown circumferential groove positioned between the tire equator and the second shoulder circumferential groove,
wherein the tread portion has five land regions separated by the first shoulder circumferential groove, the first crown circumferential groove, the second shoulder circumferential groove, and the second crown circumferential groove,
each of groove walls on both sides of the second shoulder circumferential groove is configured as a zigzag surface so that the cross section of the second shoulder circumferential groove repeats displacement in a tire axial direction along the tire circumferential direction,
groove walls on both sides of the second crown circumferential groove are configured as flat surfaces extending parallel to each other in the tire circumferential direction so that the cross sections of the second crown circumferential groove are not displaced in the tire axial direction,
each of the groove walls of the second shoulder circumferential groove is divided in the tire circumferential direction by a plurality of axial grooves,
each of the groove walls of the second shoulder circumferential groove includes first surfaces and second surfaces arranged alternately in the tire circumferential direction, the second surfaces extending in a direction different from the first surfaces, and
each of the groove walls of the second shoulder circumferential groove has 2 to 4 first surfaces between each two of the axial grooves adjacent to each other in the tire circumferential direction.

By adopting the configuration described above, the tire of the present disclosure can improve the steering stability on a dry road surface while maintaining the running performance on a snowy road surface.

DETAILED DESCRIPTION OF THE INVENTION

Figure 1:
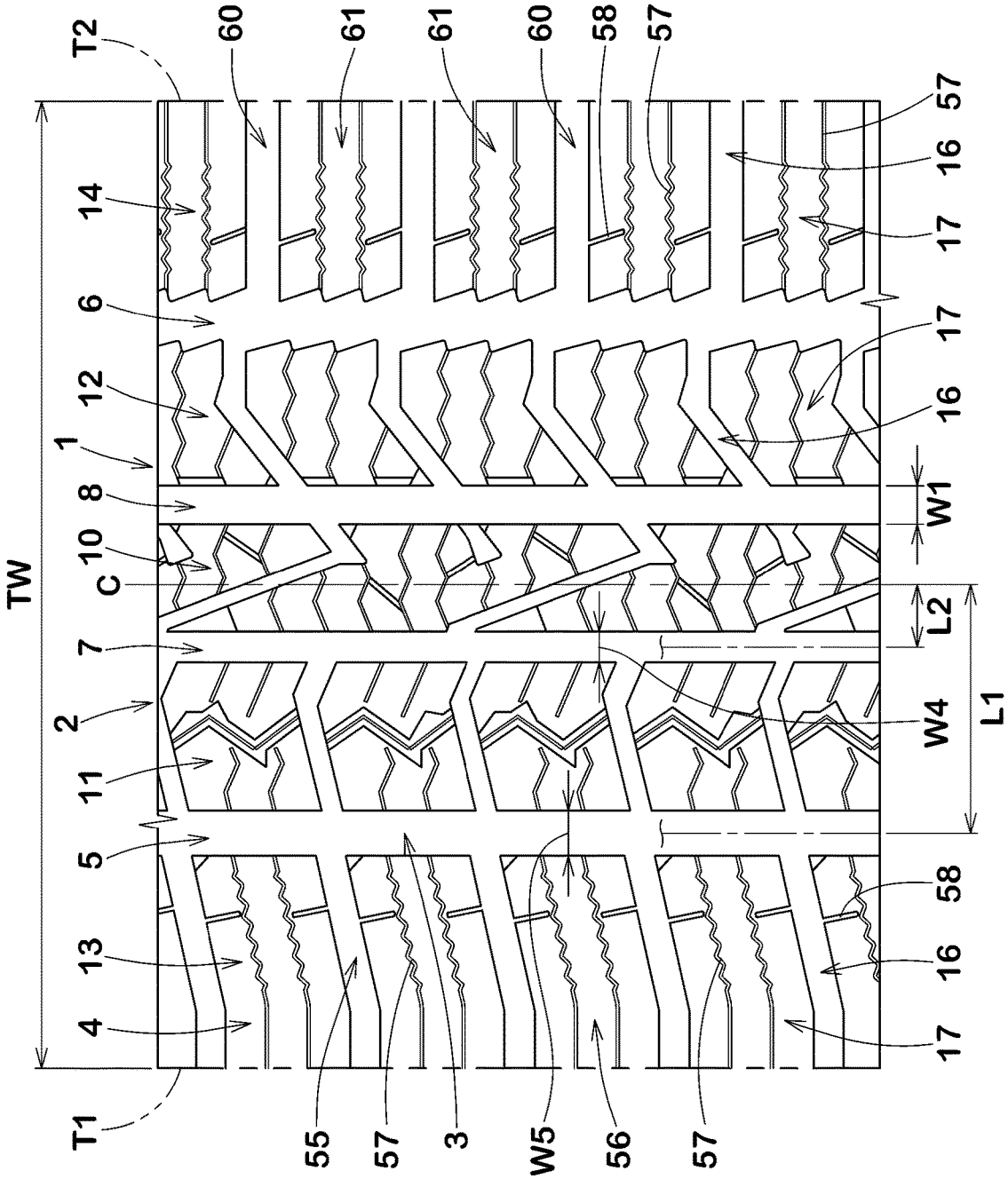
FIG. 1 is a development view of a tread portion according to an embodiment of the present disclosure.

An embodiment of the present disclosure will now be described in conjunction with accompanying drawings. FIG. 1 is a development view of a tread portion 2 of a tire 1 according to an embodiment of the present disclosure. The tire 1 of the present embodiment is a pneumatic tire for passenger cars and can be suitably used as an all-season tire (also referred to as an all-weather tire) capable of running on a snowy road surface in addition to dry road surfaces and wet road surfaces. However, the present disclosure is not limited to such a mode, and may be applied to heavy-duty pneumatic tires and non-pneumatic tires not filled with pressurized air thereinside.

As shown in FIG. 1, the tread portion 2 of the present disclosure includes a first tread edge T1, a second tread edge T2, a plurality of circumferential grooves 3 extending continuously in the tire circumferential direction between the first tread edge T1 and the second tread edge T2, and a plurality of land regions 4 demarcated by these circumferential grooves 3. In a preferred embodiment, the tire 1 of the present embodiment has the tread portion 2 provided with four circumferential grooves 3 and five land regions 4. Further, in the present embodiment, each of the land regions 4 is configured as a block row containing a plurality of blocks 17 divided or demarcated by a plurality of axial grooves 16. However, the present disclosure is not limited to such a manner.

The tread portion 2 in the present disclosure has a specified position for mounting the tire on a vehicle regarding inner and outer sides of the tread portion with respect to the vehicle. Thereby, the first tread edge T1 is intended to be located on the outer side of the vehicle when the tire 1 is mounted on the vehicle. The second tread edge T2 is intended to be located on the inner side of the vehicle when the tire 1 is mounted on the vehicle. The tread portion position for mounting the tire on a vehicle is indicated by letters or symbols on the sidewall portion(s) (not shown), for example.

The first tread edge T1 and the second tread edge T2 correspond to the edges of the ground contact surface of the tire 1 when the tire 1 in a standard state is loaded with 70% of the standard tire load and the tread portion 2 is in contact with a flat plane with zero camber angle.

In the case of tires for which various standards have been established, the "standard state" refers to a state in which the tire is mounted on a standard rim, inflated to a standard inner pressure, and loaded with no tire load. In the case of tires for which various standards have not been established or non-pneumatic tires, the standard state means a standard usage state according to the purpose of use of the tire and not being mounted on a tire rim (for non-pneumatic tires) and being loaded with no tire load. In the present specification, dimensions and the like of various parts of the tire are values measured in the standard state unless otherwise noted.

The "standard rim" refers to a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" refers to air pressure specified for the concerned tire by a standard included in a standardization system on which the tire is based, for example, the "maximum air pressure" in JATMA, the maximum value listed in the "TIRE LOAD LIMITS AT VARIOUS COLD INFLATION PRESSURES" table in TRA, and "INFLATION PRESSURE" in ETRTO.

In the case of tires for which various standards have been established, the "standard tire load" refers to a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. Further, in the case of tires for which various standards have not been established, the "standard tire load" refers to the maximum load that can be applied to the tire in accordance with the above-mentioned standards.

The circumferential grooves 3 include a first shoulder circumferential groove 5, a second shoulder circumferential groove 6, and a first crown circumferential groove 7 and a second crown circumferential groove 8 provided therebetween. The first shoulder circumferential groove 5 is provided closest to the first tread edge T1 among the plurality of circumferential grooves 3. The second shoulder circumferential groove 6 is provided closest to the second tread edge T2 among the plurality of circumferential grooves 3. The first crown circumferential groove 7 is provided between the first shoulder circumferential groove 5 and the tire equator (C). The second crown circumferential groove 8 is provided between the second shoulder circumferential groove 6 and the tire equator (C).

It is preferred that a distance L1 in the tire axial direction from the tire equator (C) to the groove center line of the first shoulder circumferential groove 5 or the second shoulder circumferential groove 6 is from 20% to 35% of a tread width TW, for example. It is preferred that a distance L2 in the tire axial direction from the tire equator (C) to the groove center line of the first crown circumferential groove 7 or the second crown circumferential groove 8 is from 5% to 15% of the tread width TW, for example. It should be noted that the tread width TW is the distance in the tire axial direction from the first tread edge T1 to the second tread edge T2 of the tire 1 in the standard state.

It should be noted that when numerical ranges of various parameters are described in the present specification, unless otherwise specified, the numerical ranges mean the numerical ranges of the average values of the parameters. In addition, the above-mentioned "average values" include, for example, values obtained by dividing the measurement target of the parameter into multiple microregions of appropriate size, measuring the parameter for each microregion, and dividing the sum of the parameters of the microregions by the number of the divided microregions.

It is preferred that each of the circumferential grooves 3 has a groove width W1 of at least 3 mm or more. Further, it is preferred that the groove width W1 of each of the circumferential grooves 3 is from 3.0% to 7.0% of the tread width TW, for example. In the case of a pneumatic tire for a passenger car, each of the circumferential grooves 3 has a depth from 5 to 10 mm, for example.

The plurality of the land regions 4 in the present embodiment includes a crown land region 10, a first middle land region 11, a second middle land region 12, a first shoulder land region 13, and a second shoulder land region 14. The crown land region 10 in the present embodiment is demarcated between the first crown circumferential groove 7 and the second crown circumferential groove 8. Thereby, the crown land region 10 is provided on the tire equator (C). The first middle land region 11 is demarcated between the first shoulder circumferential groove 5 and the first crown circumferential groove 7. The second middle land region 12 is demarcated between the second shoulder circumferential groove 6 and the second crown circumferential groove 8. The first shoulder land region 13 is demarcated axially outside the first shoulder circumferential groove 5 and includes the first tread edge T1. The second shoulder land region 14 is demarcated axially outside the second shoulder circumferential groove 6 and includes the second tread edge T2.

Figure 2:
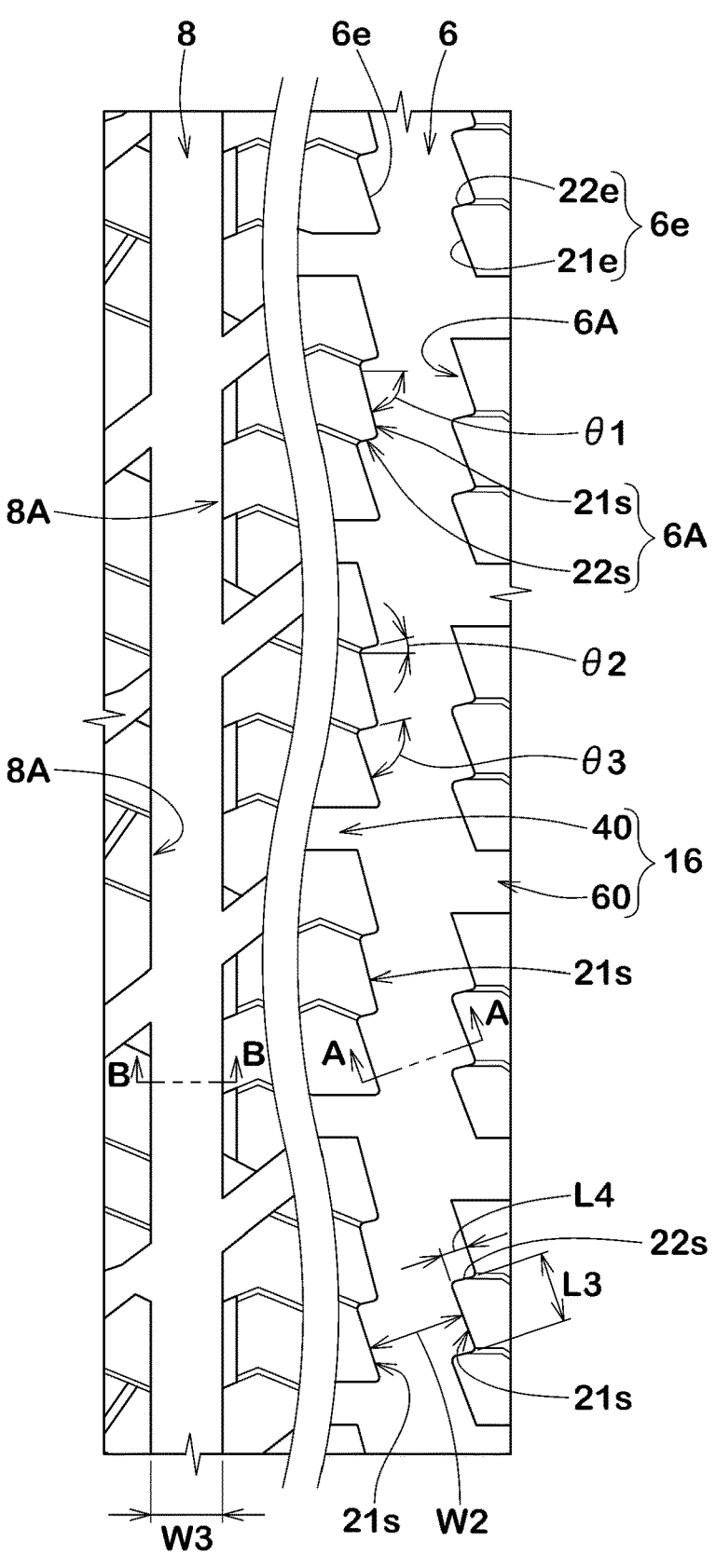
FIG. 2 is an enlarged view of a second shoulder circumferential groove and a second crown circumferential groove.
Figure 3:
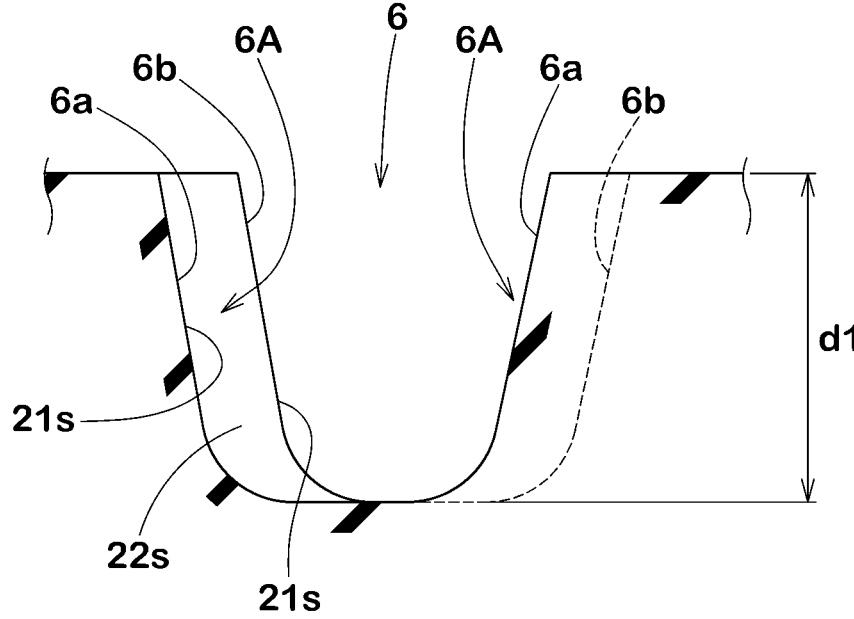
FIG. 3 is a cross-sectional view taken along A-A line in FIG. 2.
Figure 4:
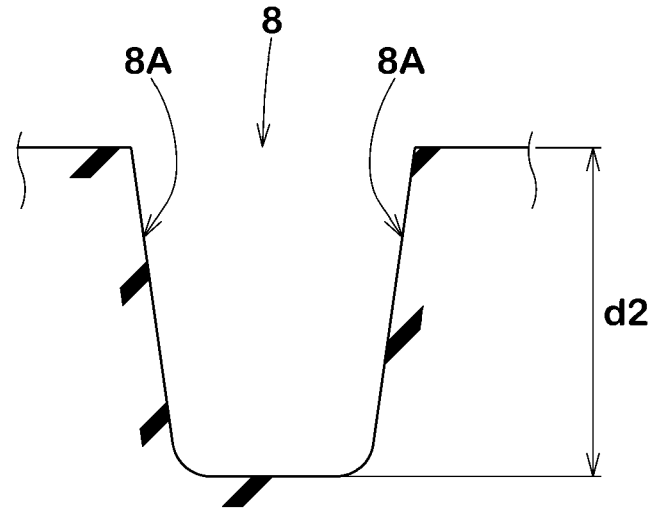
FIG. 4 is a cross-sectional view taken along B-B line in FIG. 2.

FIG. 2 shows an enlarged view of the second shoulder circumferential groove 6 and the second crown circumferential groove 8. It should be noted that the second middle land region 12 between these circumferential grooves is omitted in FIG. 2. FIG. 3 shows a cross-sectional view taken along A-A line in FIG. 2 as a cross-sectional view of the second shoulder circumferential groove 6. FIG. 4 shows a cross-sectional view taken along B-B line in FIG. 2 as a cross-sectional view of the second crown circumferential groove 8. As shown in FIGS. 2 and 3, groove walls 6A on both sides of the second shoulder circumferential groove 6 each have a zigzag surface in which the axial cross section of the second shoulder circumferential groove 6 repeats displacement in the tire axial direction as it goes in the tire circumferential direction. In other words, the second shoulder circumferential groove 6 extends in a zigzag manner in the tire circumferential direction. It should be noted that the outline of the groove walls (6a) cut along the A-A line are shown by a solid line and the groove walls (6b) displaced in the tire axial direction from the groove walls (6a) are shown by a solid or a broken line in FIG. 3 in order to make this feature easier to understand.

On the other hand, as shown in FIGS. 2 and 4, groove walls 8A on both sides of the second crown circumferential groove 8 are flat surfaces extending parallel to each other in the tire circumferential direction so that the axial cross sections of the second crown circumferential groove 8 are not displaced in the tire axial direction. In other words, even if the cross section taken along B-B line in FIG. 2 is moved in the tire circumferential direction, the outlines of the groove walls 8A shown in FIG. 4 do not move in the tire axial direction. That is to say that the second crown circumferential groove 8 extends linearly in the tire circumferential direction. By adopting the above configuration, the tire of the present disclosure can improve the steering stability on a dry road surface (hereinafter, may sometimes simply be referred to as "steering stability") while maintaining the running performance on a snowy road surface (hereinafter, may be sometimes referred to as "on-snow performance"). The mechanism is as follows.

Generally, in the case of a tire with a tread portion having the specified tread portion position for mounting the tire on a vehicle, the circumferential groove located on the innermost side of the vehicle tends to make a large contribution to the on-snow performance. Based on this, in the present disclosure, the groove walls on both sides of the second shoulder circumferential groove 6 are configured as the above-mentioned zigzag surfaces. As a result, when running on snow, hard snow blocks are formed within the second shoulder circumferential groove 6, which in turn provides a large snow shearing force in the tire axial direction, therefore, handling performance on a snowy road surface is maintained.

On the other hand, in the present disclosure, the groove walls 8A on both sides of the second crown circumferential groove 8 are configured as the above-mentioned flat surfaces. This makes it difficult for the groove walls 8A of the second crown circumferential groove 8 to deform, and as a result, the rigidity in the tire axial direction of the land regions on both sides of the second crown circumferential groove 8 is improved. Therefore, the steering stability on a dry road surface is improved. With such a mechanism, the tire 1 of the present disclosure can improve the steering stability on a dry road surface while maintaining the running performance on a snowy road surface.

More detailed configurations of the present embodiment will be explained below. It should be noted that each configuration described below indicates a specific aspect of the present embodiment. Therefore, it goes without saying that the present disclosure can exert the above effects even if it does not include the configurations described below. Further, even if any one of the configurations described below is applied alone to the tire of the present disclosure having the above-described features, performance improvement can be expected in accordance with each configuration. Furthermore, when some of the configurations described below are applied in combination, a combined performance improvement can be expected depending on each configuration in the combination.

As shown in FIG. 2, each groove edge (6e) of the second shoulder circumferential groove 6 extends in a zigzag shape. More specifically, each of the groove edges (6e) of the second shoulder circumferential groove 6 has first edge portions (21e) each extending at an angle close to the tire circumferential direction and second edge portions (22e) each extending at an angle close to the tire axial direction. Each of the second edge portions (22e) is configured to have a length smaller than that of each of the first edge portions (21e). In the present embodiment, the first edge portions (21e) and the second edge portions (22e) each extend linearly.

The groove walls 6A on both sides of the second shoulder circumferential groove 6 each include first surfaces (21s) and second surfaces (22s) arranged alternately one by one in the tire circumferential direction. The first surfaces (21s) are surfaces extending flat in the tire radial direction from the first edge portions (21e). The second surfaces (22s) extend in a direction different from the first surfaces (21s), and specifically, are surfaces extending flat in the tire radial direction from the second edge portions (22e). It should be noted that, as shown in FIG. 3, the first surfaces (21s) and the second surfaces (22s) are inclined with respect to the tire radial direction according to the draft angle that the groove walls 6A of the second shoulder circumferential groove 6 normally have. As shown in FIG. 2, the groove walls 6A of the second shoulder circumferential groove 6 in the present embodiment have the above-mentioned zigzag surfaces by alternately including the first surfaces (21s) and the second surfaces (22s) in the tire circumferential direction.

As shown in FIG. 2, an angle θ1 of each of the first surfaces (21s) with respect to the tire axial direction is preferably 60 degrees or more, more preferably 65 degrees or more, and preferably 80 degrees or less, more preferably 75 degrees or less. Further, an angle θ2 of each of the second surfaces (22s) with respect to the tire axial direction is preferably 10 degrees or more, more preferably 15 degrees or more, and preferably 30 degrees or less, and more preferably 25 degrees or less. As a result, an angle θ3 between the first surface (21s) and the second surface (22s) is from 80 to 110 degrees in each pair of the first surface (21s) and the second surface (22s) adjacent to each other. The groove walls 6A including the first surfaces (21s) and the second surfaces (22s) configured as such help form solid snow blocks when running on snow. It should be noted that the angles θ1, 02, and 03 described above are measured at the groove edges, for example.

From the point of view of forming firm snow blocks within the second shoulder circumferential groove 6, it is preferred that each of the first surfaces (21s) has a length L3 in the direction along the second shoulder circumferential groove 6 smaller than a groove width W2 of the second shoulder circumferential groove 6. Specifically, the length L3 of each of the first surfaces (21s) is from 60% to 90%, preferably from 70% to 80%, of the groove width W2 of the second shoulder circumferential groove 6. Therefore, the on-snow performance is improved while uneven wear on the groove edges of the second shoulder circumferential groove 6 is suppressed. It should be noted that the groove width W2 is the width perpendicular to the groove center line of the second shoulder circumferential groove 6, and in the present embodiment, the groove width W2 corresponds to a distance in a direction perpendicular to the groove centerline between the groove edge of one of the first surfaces (21s) included in the groove wall on the second tread edge T2 side (shown in FIG. 1) and the groove edge of opposing one of the first surfaces (21s) included in the groove wall on the tire equator (C) side (shown in FIG. 1).

Each of the second surfaces (22s) has a length L4 (so-called periphery length) of 50% or less, preferably from 20% to 40%, of the length L3 of each of the first surfaces (21s), for example. Thereby, traction performance on snow is improved while the uneven wear of the groove edges (6e) of the second shoulder circumferential groove 6 is suppressed.

In the present embodiment, the groove walls 6A on both sides of the second shoulder circumferential groove 6 are each divided in the tire circumferential direction by a plurality of the axial grooves 16 (second middle axial grooves 40 and second shoulder axial grooves 60 described later) connected with the second shoulder circumferential groove 6. The groove walls on both sides of the second shoulder circumferential groove 6 each have two to four first surfaces (21s) between each two of the axial grooves 16 adjacent to each other in the tire circumferential direction. Therefore, the on-snow performance and the steering stability on a dry road surface are improved in a good balance.

As a preferred mode, in the present embodiment, the end portions of the second middle axial grooves 40 on the second shoulder circumferential groove 6 side are misaligned in the tire circumferential direction with respect to the end portions of the second shoulder axial grooves 60 on the second shoulder circumferential groove 6 side. More specifically, the end portions of the second middle axial grooves 40 on the second shoulder circumferential groove 6 side do not overlap with the area where the end portions of the second shoulder axial grooves 60 on the second shoulder circumferential groove 6 side are extended parallel to the tire axial direction. These features make it easy for snow to be discharged from the communication portions of these axial grooves during running on a snowy road surface.

From the point of view of reliably improving the on-snow performance, it is preferred that the groove width W2 of the second shoulder circumferential groove 6 is larger than a groove width W3 of the second crown circumferential groove 8. Specifically, the groove width W2 of the second shoulder circumferential groove 6 is from 105% to 110% of the groove width W3 of the second crown circumferential groove 8. Thereby, the steering stability is improved while the on-snow performance is maintained.

As shown in FIG. 3 and FIG. 4, the second crown circumferential groove 8 has a depth (d2) from 100% to 105% of a depth (d1) of the second shoulder circumferential groove 6. Therefore, the steering stability on a dry road surface can be improved.

As shown in FIG. 1, the first shoulder circumferential groove 5 and the first crown circumferential groove 7 in the present embodiment have groove walls similar to those of the second crown circumferential groove 8. That is to say, the groove walls on both sides of the first shoulder circumferential groove 5 and the first crown circumferential groove 7 are flat surfaces extending parallel to each other in the tire circumferential direction so that the axial cross sections of the first shoulder circumferential groove 5 and the first crown circumferential groove 7 are not displaced in the tire axial direction (not shown). That is to say that the first shoulder circumferential groove 5 and the first crown circumferential groove 7 extend linearly in the tire circumferential direction. Thereby, the steering stability on a dry road surface is further improved.

It is preferred that the first crown circumferential groove 7 has a groove width W4 smaller than the groove width W2 (shown in FIG. 2) of the second shoulder circumferential groove 6 and smaller than the groove width W3 (shown in FIG. 2) of the second crown circumferential groove 8. Further, it is preferred that the first shoulder circumferential groove 5 has a groove width W5 larger than the groove width W4 of the first crown circumferential groove 7 and larger than the groove width W3 (shown in FIG. 2) of the second crown circumferential groove 8. Therefore, the steering stability on a dry road surface and the on-snow performance are improved in a good balance.

Figure 5:
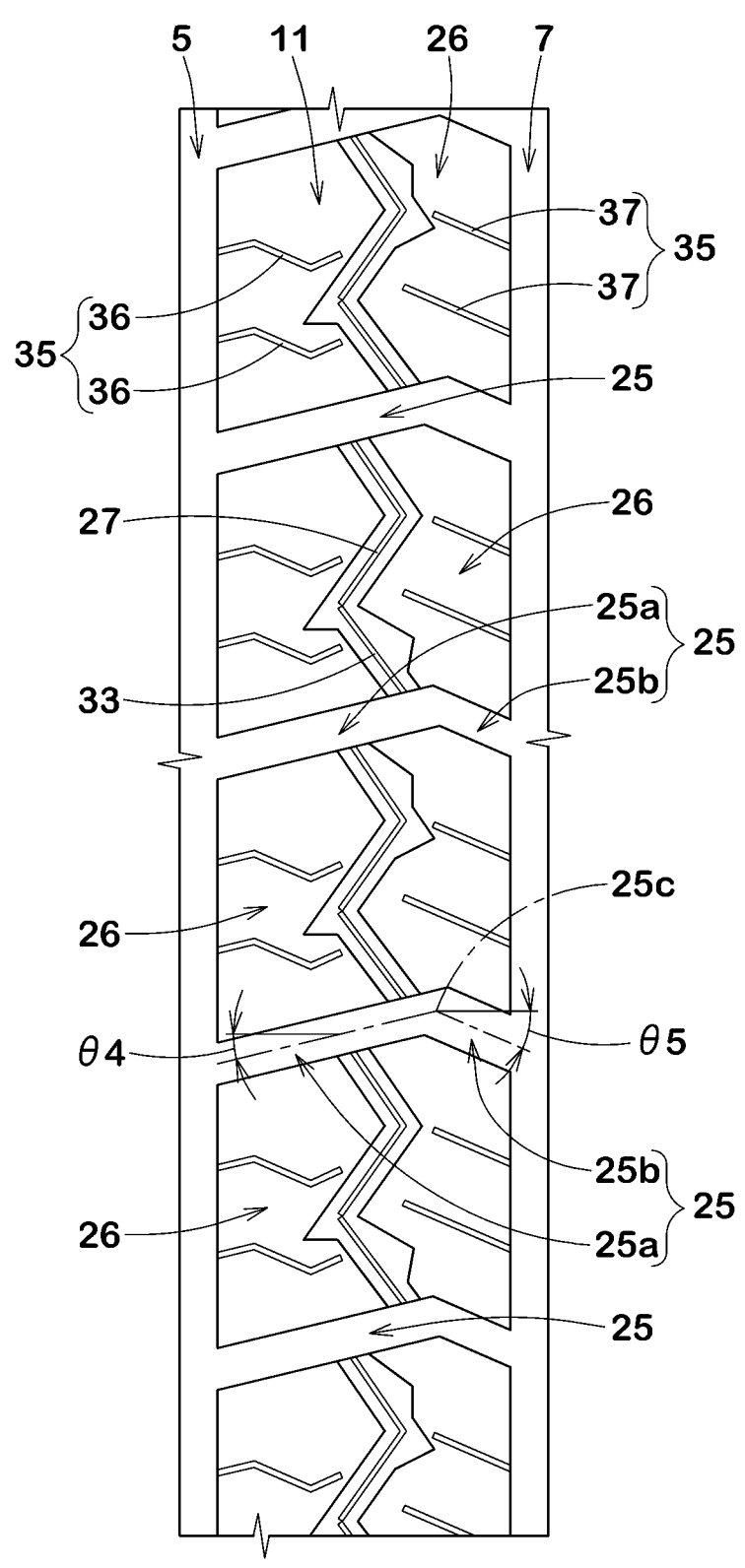
FIG. 5 is an enlarged view of a first middle land region.

FIG. 5 shows an enlarged view of the first middle land region 11 of FIG. 1. As shown in FIG. 5, the first middle land region 11 is a block row including a plurality of first middle blocks 26 separated by a plurality of first middle axial grooves 25.

Each of the first middle axial grooves 25 extends in the tire axial direction from the first shoulder circumferential groove 5 to the first crown circumferential groove 7. Each of the first middle axial grooves 25 in the present embodiment includes a first groove portion (25a) and a second groove portion (25b), for example. Each of the first groove portions (25a) and the second groove portions (25b) extends linearly. Each of the first groove portion (25a) communicates with the first shoulder circumferential groove 5 and extends obliquely with respect to the tire axial direction. Each of the first groove portions (25a) has an angle θ4 (the angle of the groove center line, the same applies hereinafter) with respect to the tire axial direction is from 10 to 20 degrees, for example. Each of the second groove portions (25b) communicates with the first crown circumferential groove 7 and is inclined to a side opposite to the first groove portions (25a) with respect to the tire axial direction. Each of the second groove portions (25b) has an angle θ5 from 15 to 25 degrees with respect to the tire axial direction, for example. The first middle axial grooves 25 including the first groove portions (25a) and the second groove portions (25b) configured as such can provide the snow shearing force also in the tire axial direction when running on snow.

It is preferred that an intersection (25c) of the groove center lines of the first groove portion (25a) and the second groove portion (25b) is located closer to the tire equator (C) (shown in FIG. 1) than the axial center position of the first middle land region 11 is. As a result, a large ground contact pressure acts near the intersections (25c), thus a harder snow blocks are formed within the first middle axial grooves 25.

Figure 6:
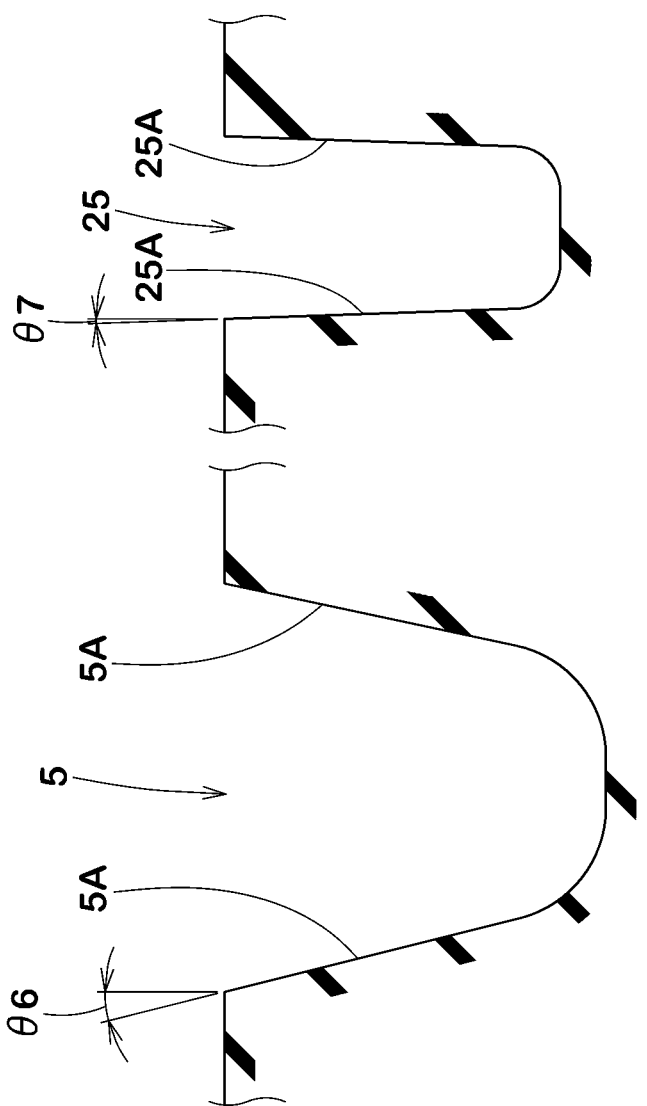
FIG. 6 is a reference diagram showing enlarged cross-sectional views of a first shoulder circumferential groove and one of first middle axial grooves arranged side by side.

FIG. 6 shows a reference diagram in which an enlarged cross-sectional view of the first shoulder circumferential groove 5 and an enlarged cross-sectional view of one of the first middle axial grooves 25 are arranged side by side. As shown in FIG. 6, it is preferred that each of groove walls 5A of the first shoulder circumferential groove 5 has an angle θ6 with respect to the tire normal line thereof is larger than an angle θ7 of each of groove walls 25A of the first middle axial grooves 25 with respect to the tire normal line thereof. Specifically, the angle θ6 is from 10 to 15 degrees. The angle θ7 is from 1 to 4 degrees. Thereby, the first middle land region 11 (shown in FIG. 5) has relatively high rigidity in the tire axial direction, hence the steering stability on a dry road surface can be improved.

Figure 7:
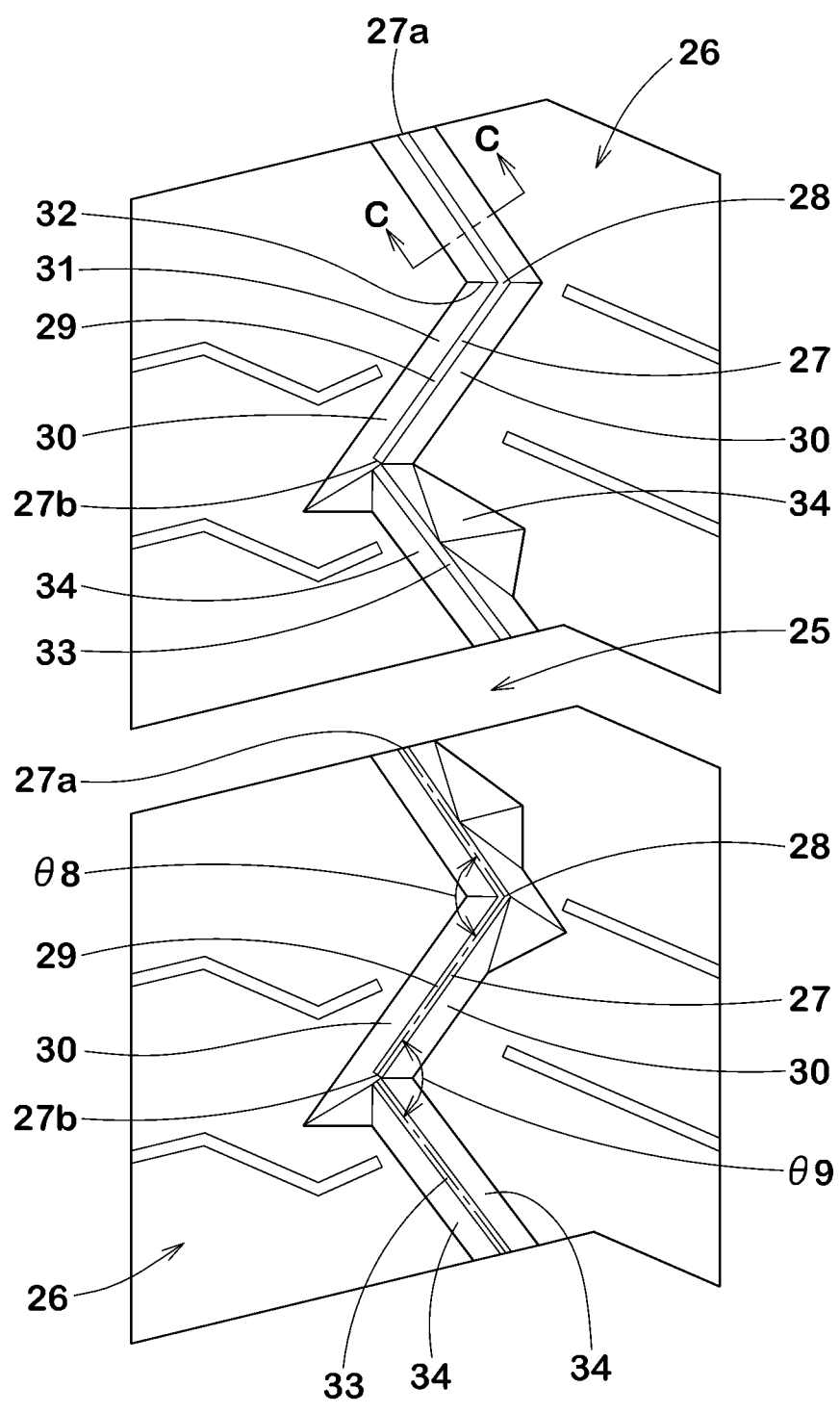
FIG. 7 is an enlarged view of two first middle blocks of FIG. 5.

FIG. 7 shows an enlarged view of two of the first middle blocks 26. Each of the first middle blocks 26 in the present embodiment is provided with one circumferential sipe 27. The circumferential sipe 27 communicates with at least one of the first middle axial groove 25 and extends in the tire circumferential direction. Further, the circumferential sipe 27 includes at least one bent portion 28 that is locally bent.

In the present specification, the term "sipe" refers to an incision having a small width, in which the width between two sipe walls is 1.5 mm or less in a sipe main body portion. Further, the sipe main body portion refers to a portion where two sipe walls extend substantially parallel to each other in the tire radial direction. The expression "substantially parallel" means an aspect in which the angle between the two sipe walls is 10 degrees or less. As described later, the sipe may have a chamfered portion formed on its edge. Furthermore, the sipe may have a so-called flask bottom in which the width thereof is increased at the bottom.

Due to the above-described configuration of the sipe, when ground contact pressure is applied, the two sipe walls in the sipe main body come into contact with each other, therefore, the rigidity of the portion where the sipe is arranged can be maintained. It should be noted that in the present specification, two groove walls of each groove do not come into contact even when ground contact pressure is applied, thereby, a substantial drainage path can be maintained. From such a point of view, the groove width of each groove is 2.0 mm or more, for example.

Since each of the circumferential sipes 27 includes the bent portion 28, the circumferential sipes 27 can provide frictional force in multiple directions on a snowy road surface by edges thereof. In addition, the opposing sipe walls mesh with each other in each of the circumferential sipes 27, thereby, a decrease in the rigidity of the blocks can be effectively suppressed. Thus, the steering stability on a dry road surface and the on-snow performance are improved.

Figure 8:
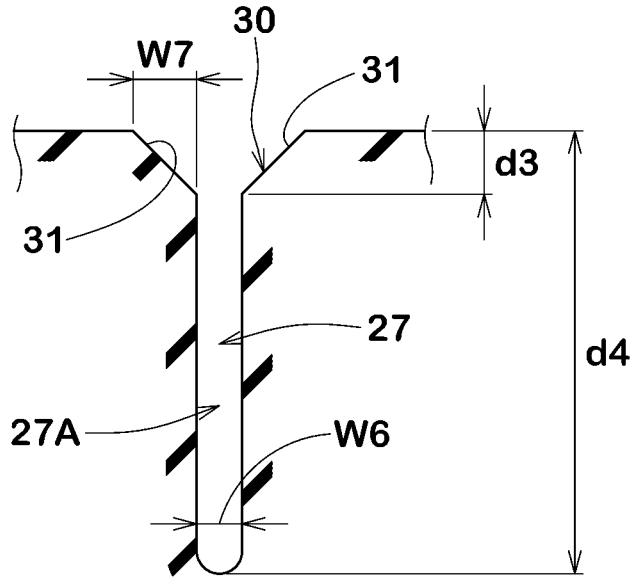
FIG. 8 is a cross-sectional view taken along C-C line in FIG. 7.

FIG. 8 shows a cross-sectional view taken along C-C line in FIG. 7. As shown in FIG. 8, a chamfered portion 30 is formed on at least one of edges of each of the circumferential sipes 27 in the present embodiment. The chamfered portion 30 means a region where the ridge corner formed by the ground contact surface of the block and the sipe wall of the sipe main body portion 27A is removed. Therefore, in each of the first middle blocks 26, the or each chamfered portion 30 includes an inclined surface 31 extending from the ground contact surface of the block at an angle with respect to the tire normal line in a cross section perpendicular to the longitudinal direction of the circumferential sipe 27. The sipes with the chamfered portion 30 can prevent the ground contact surfaces of the blocks from lifting off the road surface around the opening portions of the sipes, which helps to make the ground contact pressure uniform and prevent the uneven wear. From the point of view of exerting such an effect, it is preferred that a width W7 of the inclined surface 31 of the chamfered portion 30 is at least 50% or more of a width W6 of the sipe main body portion 27A.

Figure 9:
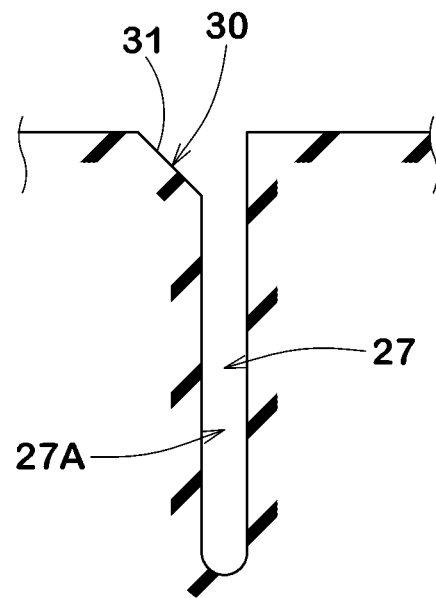
FIG. 9 is an enlarged cross-sectional view of one of circumferential sipes according to another embodiment.

The chamfered portion 30 is formed on each of the edges on both sides of each of the circumferential sipes 27 in the present embodiment. In another embodiment, the chamfered portion 30 may be formed on only one of the edges of each of the circumferential sipes 27, as shown in FIG. 9. Further, each of the inclined surfaces 31 of the present embodiment has a planar shape with a straight line in a cross section thereof. In yet another embodiment, the inclined surface 31 may be configured as a convex or concave surface so as to be curved in an arc shape in a cross section thereof, or may be bent to have two straight line segments in a cross section thereof.

As shown in FIG. 8, each of the circumferential sipes 27 in the present embodiment is provided in at least one of the edges thereof with the chamfered portion 30, therefore, the ground contact pressure does not concentrate on the edges of the circumferential sipes 27 even when a large load is applied to the blocks during running on a dry road surface, thereby, the ground contact pressure acting on the blocks can be made uniform. Consequently, the steering stability on a dry road surface can be maintained.

From the point of view of ensuring the effects described above are exerted, the width W7 of each of the inclined surfaces 31 is preferably 0.5 mm or more, more preferably 1.0 mm or more, and preferably 2.0 mm or less, and more preferably 1.5 mm or less. Similarly, each of the chamfered portions 30 has a chamfer depth (d3) in the range from 0.5 to 2.0 mm.

The maximum depth (d4) of each of the circumferential sipes 27 is from 50% to 100% of the maximum height (not shown) of the block (first middle block 26) in which the each of the circumferential sipes 27 is provided. Thereby, it is possible that the on-snow performance is maintained reliably.

As shown in FIG. 7, it is preferred that the chamfered portion 30 is formed over the entire length of each of the circumferential sipes 27. As a result, suppression of the uneven wear can be also expected in addition to the improvement in the steering stability. It should be noted that ridge lines 32 formed by the inclined surfaces 31 of the chamfered portions 30 are shown as thin lines in FIG. 7 (these ridge lines 32 are omitted in FIG. 1 and FIG. 5).

It is preferred that each of the circumferential sipes 27 has a bending angle θ8 in the range from 90 to 135 degrees at the bent portion 28. Therefore, the steering stability and the on-snow performance are improved in a good balance. It should be noted that the bending angle θ8 is an angle measured at the center line of the circumferential sipe 27.

Each of the circumferential sipes 27 has a first end (27a) communicating with one of the first middle axial grooves 25 (shown in FIG. 5) immediately adjacent thereto and a second end (27b) terminating within the block to have a closed terminating end. Further, each of the first middle blocks 26 is provided with a sub circumferential sipe 33. In each of the first middle blocks 26, the sub circumferential sipe 33 communicates with other first middle axial groove 25 located on the opposite side of the first middle axial groove 25 with which the circumferential sipe 27 communicates, and extends in the tire circumferential direction. In each of the first middle blocks 26, the sub circumferential sipe 33 terminates within the block to have a closed terminating end. Further, the shortest distance between the terminating end of the sub circumferential sipe 33 and the terminating end of the circumferential sipe 27 is 2.0 mm or less in each of the first middle blocks 26. As a result, the rigidity of the first middle blocks 26 can be maintained, and thus the steering stability can be improved, compared to a case where each of the first middle blocks 26 is provided with the circumferential sipe 27 completely crossing the first middle block 26 in the tire circumferential direction.

Each of the sub circumferential sipes 33 is provided with at least one chamfered portion 34. It is preferred that the chamfered portion(s) 34 of the sub circumferential sipe 33 is (are) connected with the chamfered portion(s) 30 of the circumferential sipe 27 in each of the first middle blocks 26. Thereby, the steering stability and uneven wear resistance performance are improved.

The circumferential sipe 27 includes a portion 29 extending from the terminating end of the circumferential sipe 27 at an angle (i.e., obliquely) to a first side with respect to the tire circumferential direction. The sub circumferential sipe 33 is inclined to a second side opposite to the first side with respect to the tire circumferential direction. This results in an abrupt change in the orientation of the sipes between the above-described portion 29 of the circumferential sipe 27 and the sub circumferential sipe 33. Further, an angle θ9 between them is in the range from 90 to 135 degrees, similar to the angle θ8 of the bent portion 28 of each of the circumferential sipes 27. The circumferential sipes 27 and the sub circumferential sipes 33 configured as such can provide frictional force in multiple directions and thus improve the cornering performance on snow.

In another embodiment, for example, the circumferential sipe 27 and the sub circumferential sipe 33 in the present embodiment may be connected (communicated) with each other to form a single circumferential sipe 27 completely crossing the block in the tire circumferential direction. In such an embodiment, the on-snow performance can be further improved.

As shown in FIG. 5, each of the first middle blocks 26 is provided with a plurality of first middle axial sipes 35 extending in the tire axial direction from the first shoulder circumferential groove 5 or from the first crown circumferential groove 7. It is preferred that each of the first middle axial sipes 35 terminates without communicating with the circumferential sipe 27 in each of the first middle blocks 26. The first middle axial sipes 35 configured as such can improve the steering stability and the on-snow performance in a good balance.

The first middle axial sipes 35 include (consist of in the present embodiment) outer first middle axial sipes 36 and inner first middle axial sipes 37. The outer first middle axial sipes 36 communicate with the first shoulder circumferential groove 5 and each extend in a zigzag shape. The inner first middle axial sipes 37 communicate with the first crown circumferential groove 7 and each extend in the tire axial direction linearly and obliquely with respect to the tire axial direction. As a result, the rigidity of the region on the first shoulder circumferential groove 5 side from the circumferential sipe 27 is relatively greater in each of the first middle blocks 26, therefore, the steering stability can be improved while maintaining the on-snow performance.

Figure 10:
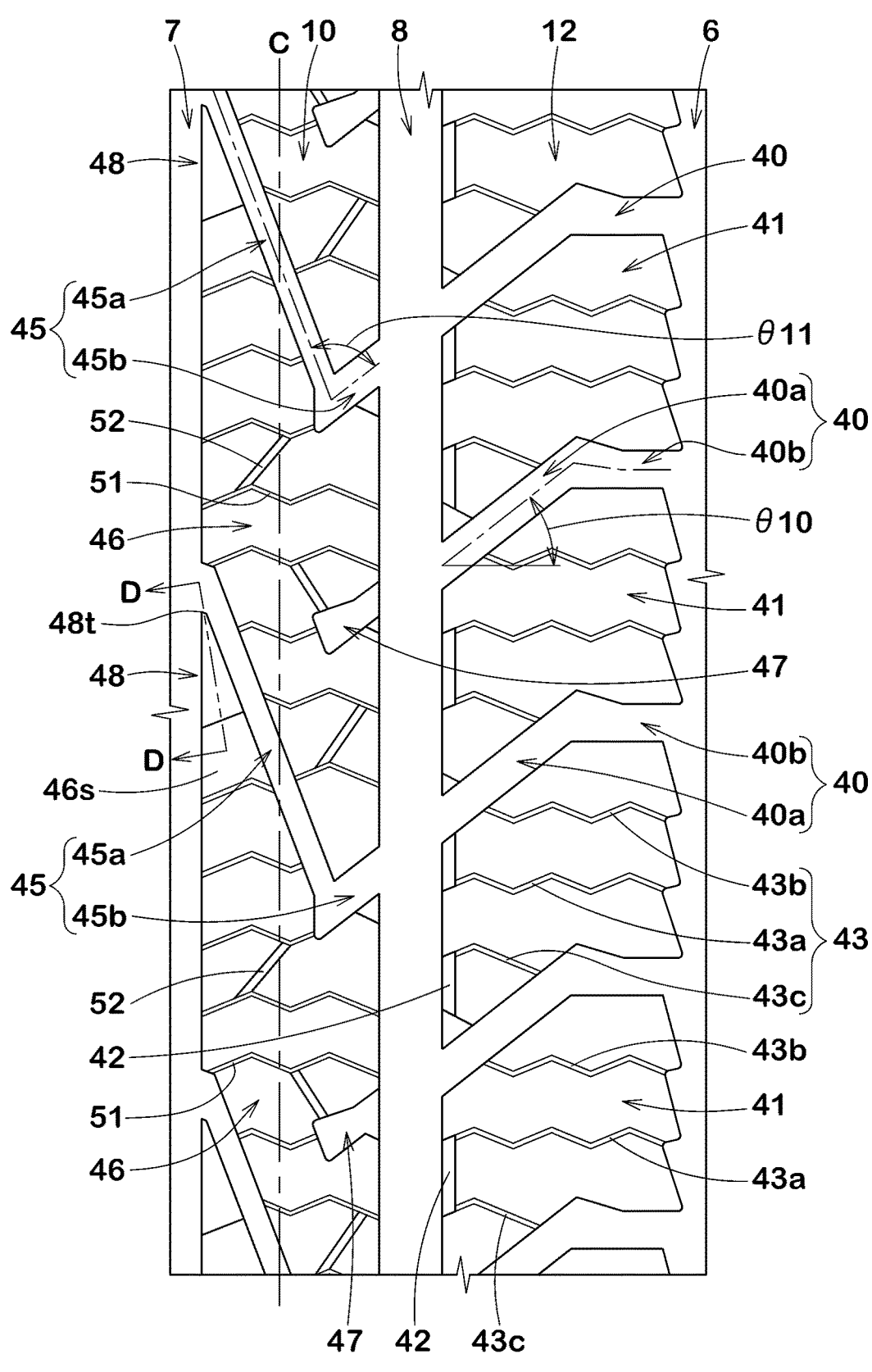
FIG. 10 is an enlarged view of a second middle land region and a crown land region of FIG. 1.

FIG. 10 shows an enlarged view of the second middle land region 12 and the crown land region 10 of FIG. 1. As shown in FIG. 10, the second middle land region 12 is a block row including a plurality of second middle blocks 41 separated by a plurality of the second middle axial grooves 40.

The second middle axial grooves 40 extend in the tire axial direction from the second shoulder circumferential groove 6 to the second crown circumferential groove 8. Each of the second middle axial grooves 40 in the present embodiment includes (consists of in the present embodiment) a first groove portion (40a) and a second groove portion (40b), for example. Each of the first groove portion (40a) and the second groove portion (40b) extends linearly. The first groove portion (40a) communicates with the second crown circumferential groove 8 and extends obliquely with respect to the tire axial direction. The first groove portion (40a) has an angle θ10 in the range from 30 to 50 degrees with respect to the tire axial direction, for example. The second groove portion (40b) communicates with the second shoulder circumferential groove 6 and extends at an angle smaller than the first groove portion (40a) with respect to the tire axial direction. The angle of the second groove portion (40b) is 10 degrees or less with respect to the tire axial direction. The first middle axial grooves 25 including the first groove portions (40a) and the second groove portions (40b) configured as such, together with the second shoulder circumferential groove 6 described above, can improve the steering stability and the on-snow performance in a good balance.

The second middle blocks 41 in the present embodiment are provided with partially chamfered portions 42 in which the edge corners between the ground contact surfaces of the second middle blocks 41 and the groove wall of the second crown circumferential groove 8 are cut out, for example. As a result, the uneven wear of the second middle blocks 41 is suppressed.

Each of the second middle blocks 41 is provided with a plurality of second middle sipes 43 extending in the tire axial direction. Each of the second middle sipes 43 extends in a zigzag shape. The second middle sipes 43 configured as such can improve the on-snow performance while maintaining the rigidity of the second middle blocks 41.

The second middle sipes 43 include large second middle sipes (43a), medium second middle sipes (43b), and small second middle sipes (43c). Each of the large second middle sipes (43a) extends from the second shoulder circumferential groove 6 to the second crown circumferential groove 8. Each of the medium second middle sipes (43b) extends from the second shoulder circumferential groove 6 to the first groove portion (40a) of one of the second middle axial grooves 40 adjacent thereto. Each of the small second middle sipes (43c) extends from the first groove portion (40a) of one of the second middle axial grooves 40 adjacent thereto to the second crown circumferential groove 8. Each of the second middle blocks 41 in the present embodiment is provided with one large second middle sipe (43a), one medium second middle sipe (43b), and one small second middle sipe (43c). Therefore, the steering stability on a dry road surface and the on-snow performance are improved in a good balance.

The crown land region 10 is a block row including a plurality of crown blocks 46 separated by a plurality of crown axial grooves 45.

Each of the crown axial grooves 45 extends from the first crown circumferential groove 7 to the second crown circumferential groove 8. Each of the crown axial grooves 45 in the present embodiment includes (consists of in the present embodiment) a first groove portion (45a) inclined in a first direction with respect to the tire axial direction, and a second groove portion (45b) inclined in a direction opposite to the first groove portion (45a) with respect to the tire axial direction. The first groove portion (45a) and the second groove portion (45b) each extend linearly and are inclined at an angle from 40 to 70 degrees with respect to the tire axial direction. Accordingly, an angle θ11 between the first groove portion (45a) and the second groove portion (45b) is from 70 to 90 degrees in each of the crown axial grooves 45. The crown axial grooves 45 having the first groove portions (45a) and the second groove portions (45b) configured as such can form hard snow blocks inside, and thus the on-snow performance can be further improved.

Each of the first groove portions (45a) preferably crosses the center position in the tire axial direction of the crown land region 10, and more preferably crosses the tire equator (C), for example. Thereby, hard snow blocks are formed in the first groove portions (45a), therefore, the cornering performance on snow is improved.

It is preferred that, in each pair of one of the crown axial grooves 45 and one of the second middle axial grooves 40 adjacent to each other, the second groove portions (45b) of the crown axial groove 45 overlaps with a virtual region obtained by extending the first groove portion (40a), in the length direction thereof, of the second middle axial groove 40, for example. As a result, during running on snow, the crown axial grooves 45 and the second middle axial grooves 40 can cooperate to form long snow blocks in the tire axial direction, therefore, the traction performance on snow is improved.

Each of the crown blocks 46 is provided with a single crown short groove 47. The crown short groove 47 extends from the second crown circumferential groove 8 to terminate within the crown block 46, for example. The crown short groove 47 is inclined to the same side as the second groove portions (45b) of the crown axial grooves 45 with respect to the tire axial direction, and in a preferred embodiment, the angular difference between these is 10 degrees or less. Further, in each pair of one of the crown short grooves 47 and one of the second middle axial grooves 40 adjacent to each other, it is preferred that the crown short groove 47 overlaps with a virtual region obtained by extending the first groove portion (40a), in the length direction thereof, of the second middle axial groove 40. The crown short grooves 47 configured as such can improve the on-snow performance while maintaining the rigidity of the crown blocks 46.

Figure 11:
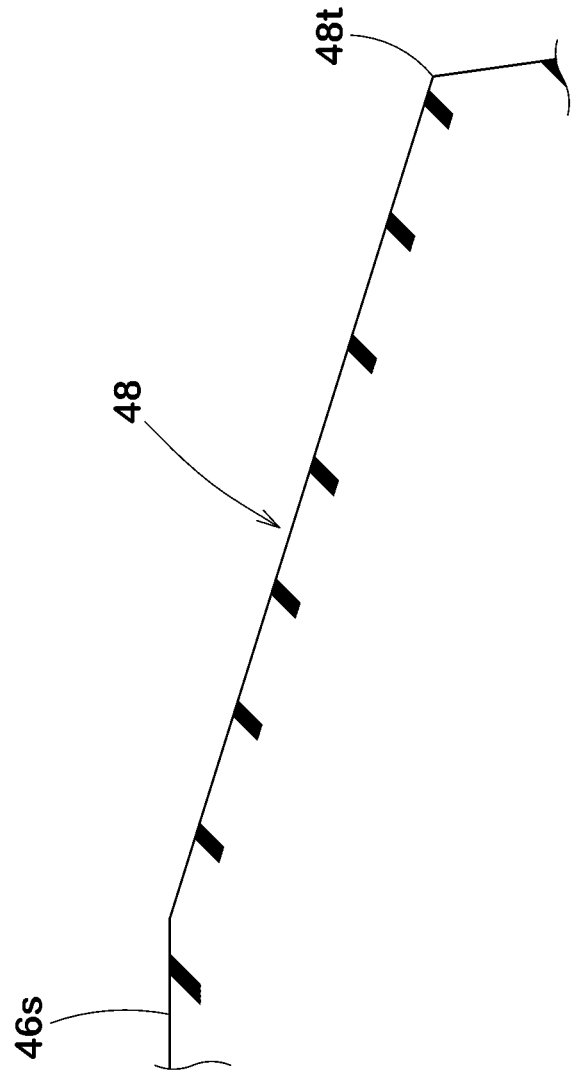
FIG. 11 is a cross-sectional view taken along D-D line in FIG. 10.

Each of the crown blocks 46 is provided with a tapered portion 48 between the first crown circumferential groove 7 and the first groove portion (45a) of one of the crown axial grooves 45, in the present embodiment, the first groove portion (45a) farther away from the crown short groove 47, for example. The tapered portion 48 has a width decreasing toward the end in the tire circumferential direction of the crown block 46. In other words, the tapered portion 48 in the present embodiment has the width decreasing toward the connection of the farther away first groove portion (45a) with the first crown circumferential groove 7. FIG. 11 shows a cross-sectional view taken along D-D line in FIG. 10. As shown in FIG. 11, the tapered portion 48 is provided with a planar chamfer. The tapered portions 48 configured as such cooperate with the crown axial grooves 45 and the first crown circumferential groove 7 (shown in FIG. 10) to compact the snow and improve the traction performance on snow.

Figure 12:
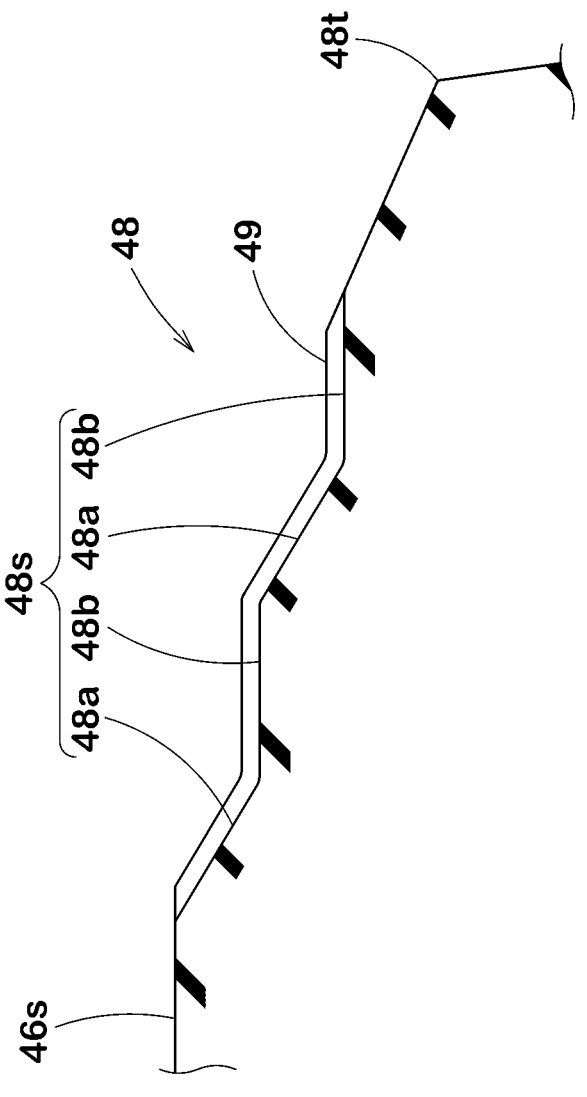
FIG. 12 is a cross-sectional view of a tapered portion of one of crown blocks according to another embodiment.

FIG. 12 shows an enlarged cross-sectional view of the tapered portion 48 of each of the crown blocks 46 in another embodiment of the present disclosure. The tapered portion 48 of this embodiment has a stepped outer surface (48s) in which first surfaces (48a) and second surfaces (48b) are arranged alternately one by one. The first surfaces (48a) are inclined with respect to a ground contact surface (46s) of the crown block 46. The second surfaces (48b) extend along the ground contact surface (46s). This outer surface (48s) is provided with a plurality of protruding ribs 49 locally protruding and extending toward a tip (48t) of the tapered portion 48. The tapered portions 48 configured as such can prevent snow from clogging the first crown circumferential groove 7 and the crown axial grooves 45 (shown in FIG. 10) while preventing the crown blocks 46 from chipping.

As shown in FIG. 10, each of the crown blocks 46 is provided with a plurality of first crown sipes 51 each extending in the tire axial direction in a zigzag manner and a plurality of second crown sipes 52 each having at least one end communicating with one of the first crown sipes 51. The first crown sipes 51 extend in a zigzag manner, and include ones extending from the first crown circumferential groove 7 to the second crown circumferential groove 8, ones each extending from the first crown circumferential groove 7 to a respective one of the crown axial grooves 45, and ones each extending from the second crown circumferential groove 8 to a respective one of the crown axial grooves 45. Each of the second crown sipes 52 extends linearly and either communicates with two of the first crown sipes 51 adjacent to each other in the tire circumferential direction or extends from one of the crown short grooves 47 to one of the first crown sipes 51 adjacent thereto. The first crown sipes 51 and the second crown sipes 52 configured as such can provide frictional force in multiple directions by edges thereof.

Figure 13:
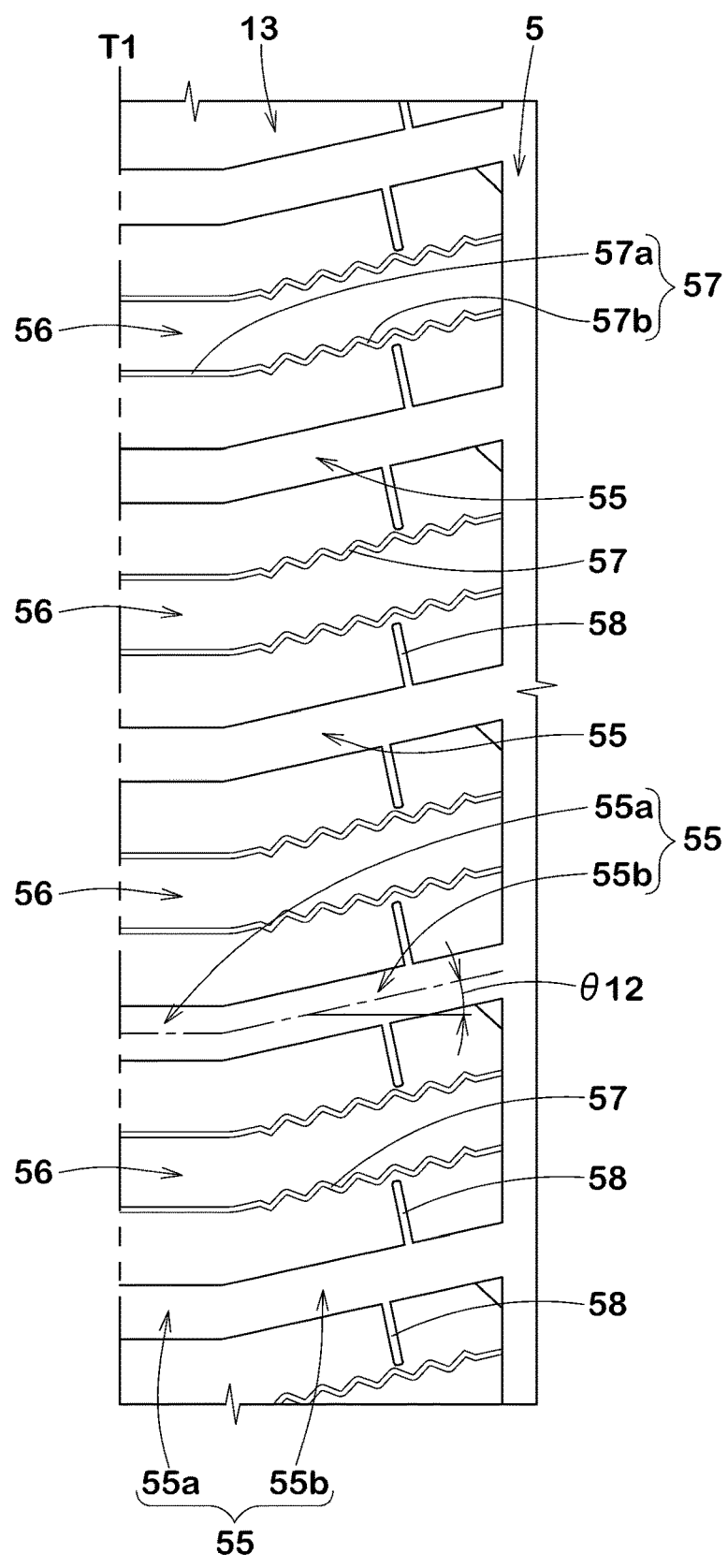
FIG. 13 is an enlarged view of a first shoulder land region of FIG. 1.

FIG. 13 shows an enlarged view of the first shoulder land region 13 of FIG. 1. As shown in FIG. 13, the first shoulder land region 13 is a block row including a plurality of first shoulder blocks 56 separated by a plurality of first shoulder axial grooves 55.

Each of the first shoulder axial grooves 55 includes (consists of in the present embodiment) a first groove portion (55a) and a second groove portion (55b) located on the axially inner side of the first groove portion, for example. The second groove portion (55b) extends from the first shoulder circumferential groove 5 to the first groove portion (55a), for example. The first groove portion (55a) extends axially outward from the second groove portion (55b) so as to cross the first tread edge T1, for example. The first groove portion (55a) has an angle of 10 degrees or less with respect to the tire axial direction. The second groove portion (55b) is inclined at an angle larger than the first groove portion (55a) with respect to the tire axial direction. The second groove portion (55b) has an angle θ12 in the range from 10 to 20 degrees with respect to the tire axial direction, for example.

Each of the first shoulder blocks 56 is provided with a plurality of shoulder axial sipes 57 and a plurality of shoulder circumferential sipes 58. Each of the shoulder axial sipes 57 extends from the first shoulder circumferential groove 5 to the first tread edge T1. Each of the shoulder axial sipes 57 includes (consists of in the present embodiment) a first sipe portion (57a) and a second sipe portion (57b). The first sipe portion (57a) extends linearly in parallel with the first groove portions (55a) of the first shoulder axial grooves 55. The second sipe portion (57b) extends in a zigzag shape and is inclined to the same side as the second groove portions (55b) of the first shoulder axial grooves 55. In a preferred embodiment, the second sipe portion (57b) is configured as a so-called 3D sipe extending in a zigzag shape also in the tire radial direction in a cross section thereof. The shoulder axial sipes 57 configured as such can improve the on-snow performance while maintaining the rigidity of the first shoulder blocks 56.

Each of the shoulder circumferential sipes 58 extends from a respective one of the first shoulder axial grooves 55 and terminates within a respective one of the first shoulder blocks 56, for example. It is preferred that the shoulder circumferential sipes 58 terminate without communicating with any of the shoulder axial sipes 57. The shoulder circumferential sipes 58 configured as such help to improve the steering stability and the on-snow performance in a good balance.

As shown in FIG. 1, the second shoulder land region 14 is a block row including a plurality of second shoulder blocks 61 separated by a plurality of the second shoulder axial grooves 60. The second shoulder blocks 61 are provided with the shoulder axial sipes 57 and the shoulder circumferential sipes 58 similar to those of the first shoulder blocks 56. The above-described configurations can be applied to these sipes.

Figure 14:
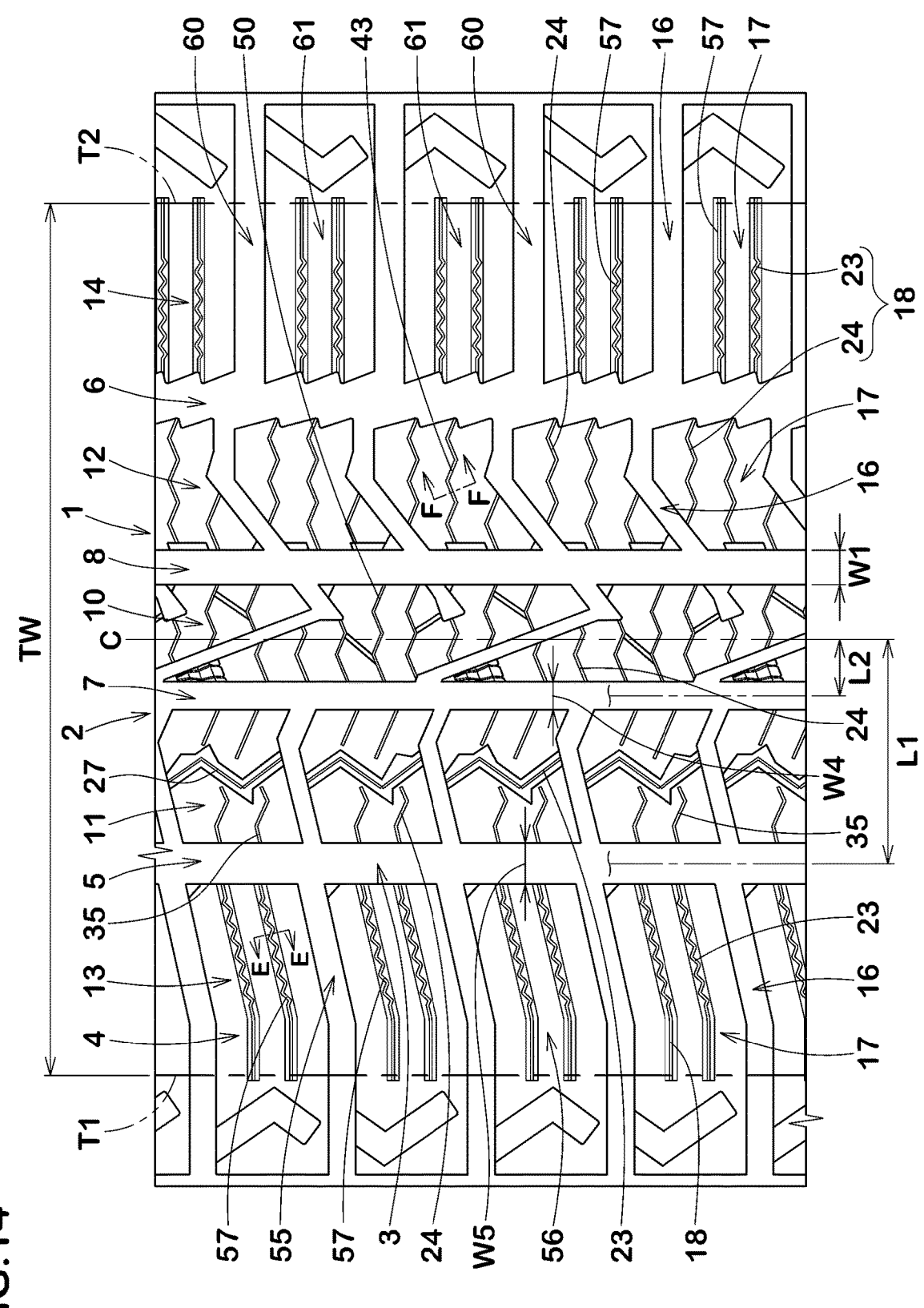
FIG. 14 is a development view of the tread portion according to another embodiment.

FIG. 14 is a development view of the tread portion 2 according to another embodiment of the present disclosure. In the embodiment shown in FIG. 14, elements common to the above-described embodiments are assigned with the same reference numerals, and the above-described configurations can be applied. As shown in FIG. 14, in this embodiment, each of the land regions 4 is configured as a block row including a plurality of the blocks 17 separated by a plurality of the axial grooves 16. Further, each of the blocks 17 in this embodiment is provided with a plurality of sipes 18.

Figure 15:
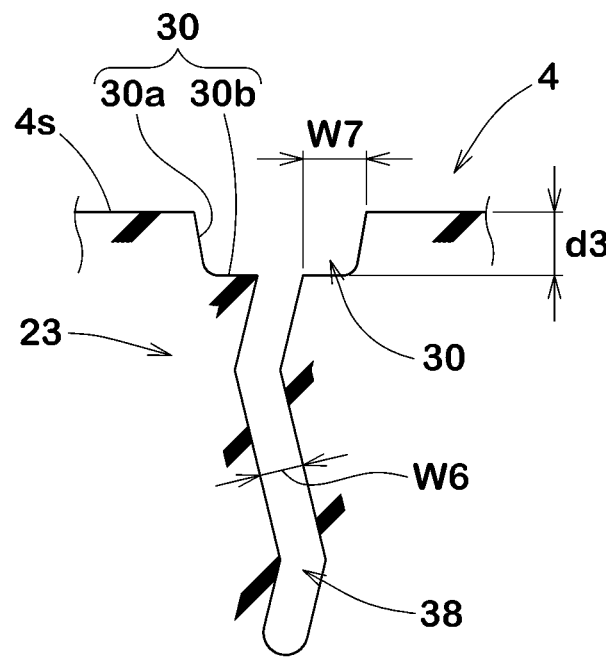
FIG. 15 is a cross-sectional view taken along E-E line of FIG. 14.

The sipes 18 include chamfered sipes 23 and/or non-chamfered sipes 24. FIG. 15 shows a cross-sectional view taken along E-E line in FIG. 14 as an example of the chamfered sipe 23. The chamfered sipe 23 shown in FIG. 15 corresponds to one of the shoulder axial sipes 57 provided in the first shoulder land region 13.

As shown in FIG. 15, at least one of the edges on both sides of each of the chamfered sipes 23 is provided with the chamfered portion 30. In the embodiment shown in FIG. 15, each of the edges is provided with the chamfered portion 30. However, the chamfered sipes 23 of the present disclosure are not limited to such a manner, and each of the chamfered sipes 23 may be provided with the chamfered portion 30 on only one of the edges thereof as in the chamfered sipe 23 according to yet another embodiment shown in FIG. 16.

The chamfered portion 30 means the portion where the ridge corner formed by the ground contact surface of the block and one of the sipe walls of a sipe main body portion 38 is removed. As shown in FIG. 15, it is preferred that the width W7 of the chamfered portion 30 is at least 50% or more of the width W6 of the sipe main body portion 38.

Figure 17:
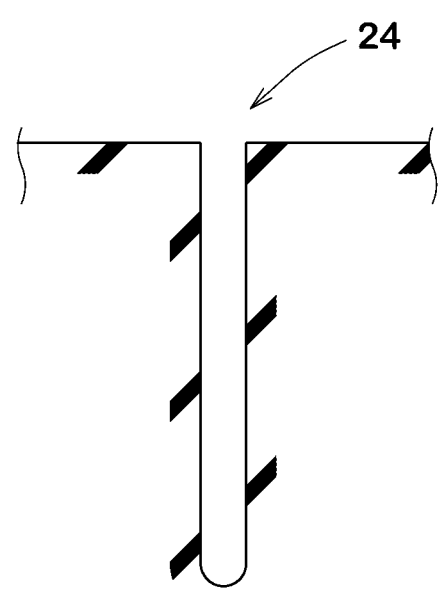
FIG. 17 is a cross-sectional view taken along F-F line of FIG. 14.

FIG. 17 shows a cross-sectional view taken along F-F line in FIG. 14 as an example of the non-chamfered sipes 24. The non-chamfered sipe 24 shown in FIG. 17 corresponds to one of the second middle sipes 43 provided in the second middle land region 12. As shown in FIG. 17, each of the non-chamfered sipes 24 has no chamfered portions formed on either of the edges.

As shown in FIG. 14, in this embodiment, when the ratio of the total length of the chamfered sipes 23 to the total length of the sipes 18 is defined as a chamfered sipe ratio (Rcs) for each of the land regions 4, the chamfer sipe ratio (Rcs) of the first shoulder land region 13 is larger than the chamfer sipe ratio (Rcs) of at least one of the other land regions 4 (the crown land region 10, the first middle land region 11, and the second middle land region 12 in this embodiment). It should be noted that, when a portion configured as the chamfered sipe 23 and a portion configured as the non-chamfered sipe 24 are included in one sipe 18, the chamfered sipe ratio (Rcs) shall be calculated by adding the lengths of the portions configured as the chamfered sipes 23.

In this embodiment, the above-described configuration makes it possible to improve the steering stability while maintaining the on-snow performance. The reasons are as follows.

As described above, the tire 1 in this embodiment has the land regions 4 each configured as a block row including a plurality of the blocks 17 separated by a plurality of the axial grooves 16, and each of the blocks 17 is provided with a plurality of the sipes 18. The axial grooves 16 and the blocks 17 provide the snow shearing force on a snowy road surface. Further, the sipes 18 provide the frictional force by edges thereof. Thereby, the running performance on a snowy road surface is improved. On the other hand, as a result of various studies, it was found that when the on-snow performance was improved by the edges of the sipes, the ground contact pressure acting on various parts of the tread portion 2 became uneven, which tended to impair the steering stability on a dry road surface.

In contrast, the chamfered sipe ratio (Rcs) of the first shoulder land region 13 is greater than the chamfered sipe ratio (Rcs) of at least one of the other land regions 4 in this embodiment. Therefore, relatively large number of the sipes 18 having the chamfered portions 30 are provided in the first shoulder land region 13 which greatly contributes to the steering stability. Therefore, the ground contact pressure in the first shoulder land region 13 can be expected to be more uniform during braking on a dry road surface and the like, thereby, the steering stability on a dry road surface can be improved.

On the other hand, relatively large number of the sipes without the chamfered portion 30 are provided in the other land regions 4, which contribute more to the on-snow performance than the first shoulder land region 13. Therefore, in the other land regions 4, a high edge effect can be expected due to the sipes 18, and thus the running performance on a snowy road surface can be maintained.

As shown in FIG. 14, the sipes 18 (the shoulder axial sipes 57) provided in the first shoulder land region 13 are all configured as the chamfered sipes 23 in this embodiment. As a result, the chamfered sipe ratio (Rcs) of the first shoulder land region 13 is 100%. The same applies to the second shoulder land region 14. Thereby, the chamfered sipe ratio (Rcs), which is 100%, of the second shoulder land region 14 is larger than the chamfered sipe ratio (Rcs) of the other land regions 4. Thus, the steering stability on a dry road surface is surely improved.

Further, the sipes 18 (crown sipes 50) provided in the crown land region 10 are configured as the non-chamfered sipes 24. Similarly, the sipes 18 (the second middle sipes 43) provided in the second middle land region 12 are also configured as the non-chamfered sipes 24. As a result, the chamfered sipe ratio (Rcs) is 0% in the crown land region 10 and the second middle land region 12. Therefore, the on-snow performance is certainly maintained.

Regarding the sipes 18 provided in the first middle land region 11, the circumferential sipes 27 are configured as the chamfered sipes 23, and the first middle axial sipes 35 are configured as the non-chamfered sipes 24. As a result, the first middle land region 11 is configured to have the chamfered sipe ratio (Rcs) from 30% to 50%. Therefore, the steering stability and the on-snow performance can be improved in a good balance. However, the present disclosure is not limited to this embodiment.

As shown in FIG. 15, each of the chamfered portions 30 of the chamfered sipes 23 includes, in a cross section thereof, a radial surface (30a) extending in the tire radial direction from a ground contact surface (4s) of the land region 4, and a flat bottom surface (30*b*) extending from the radial surface (30*a*) along the ground contact surface (4*s*). The chamfered portions 30 configured as such can also be expected to improve wet performance.

Figure 16:
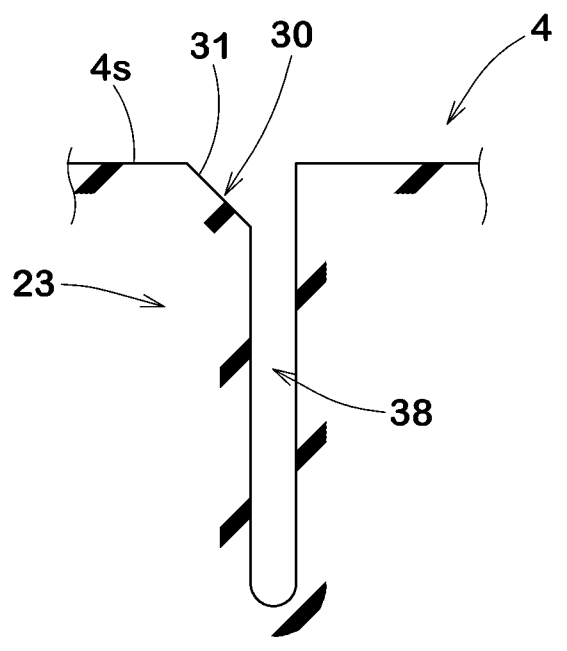
FIG. 16 is a cross-sectional view of one of chamfered sipes according to another embodiment.

The chamfered portion 30 is not limited to the embodiment shown in FIG. 15. As shown in FIG. 16, the chamfered portion 30 may be configured to include, in a cross section thereof, the inclined surface 31 extending from the ground contact surface (4*s*) of the land regions 4 at an angle with respect to the tire normal line so as to be continuous with one of the sipe walls of the sipe main body portion 38 extending in the tire radial direction. This inclined surface 31 has a planar shape with a straight line in the cross section thereof. In other embodiments, the inclined surface 31 may be configured as a convex or concave surface curved in an arc shape in the cross section thereof. The chamfered portions 30 configured as such help to make the ground contact pressure further uniform.

As shown in FIG. 15, from the point of view of making the ground contact pressure more uniform, the width W7 of the chamfered portion 30 (which is the width of one chamfered portion in a plan view of the ground contact surface) is preferably 0.5 mm or more, more preferably 1.0 mm or more, and preferably 2.0 mm or less, more preferably 1.5 mm or less. Similarly, the chamfer depth (d3) of the chamfered portion 30 is from 0.5 to 2.0 mm.

It is preferred that the sipe main body portion 38 of each of the chamfered sipes 23 has a wavy form. As a result, the two sipe walls of each of the sipe main body portions 38 mesh with each other when the ground contact pressure is applied to the land regions 4, therefore, the apparent rigidity of the land regions 4 can be increased. Thereby, the steering stability can be reliably improved.

Figure 18:
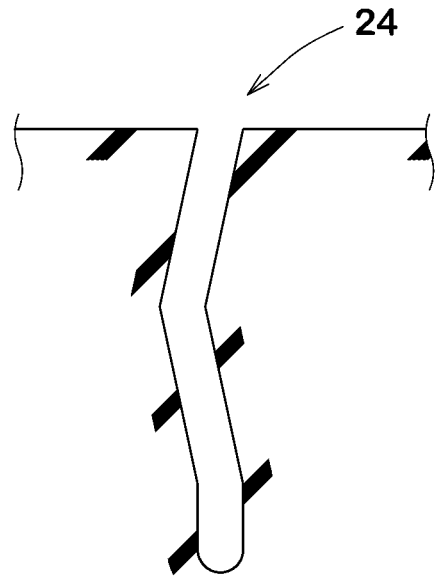
FIG. 18 is a cross-sectional view of one of non-chamfered sipes according to another embodiment.

As shown in FIG. 17, each of the non-chamfered sipes 24 extends linearly in the tire radial direction in the cross section thereof. However, the non-chamfered sipes 24 are not limited to such a mode, and each of the non-chamfered sipes 24 may extend in a wavy manner in the tire radial direction in the cross section thereof as shown in FIG. 18.

Figure 19:
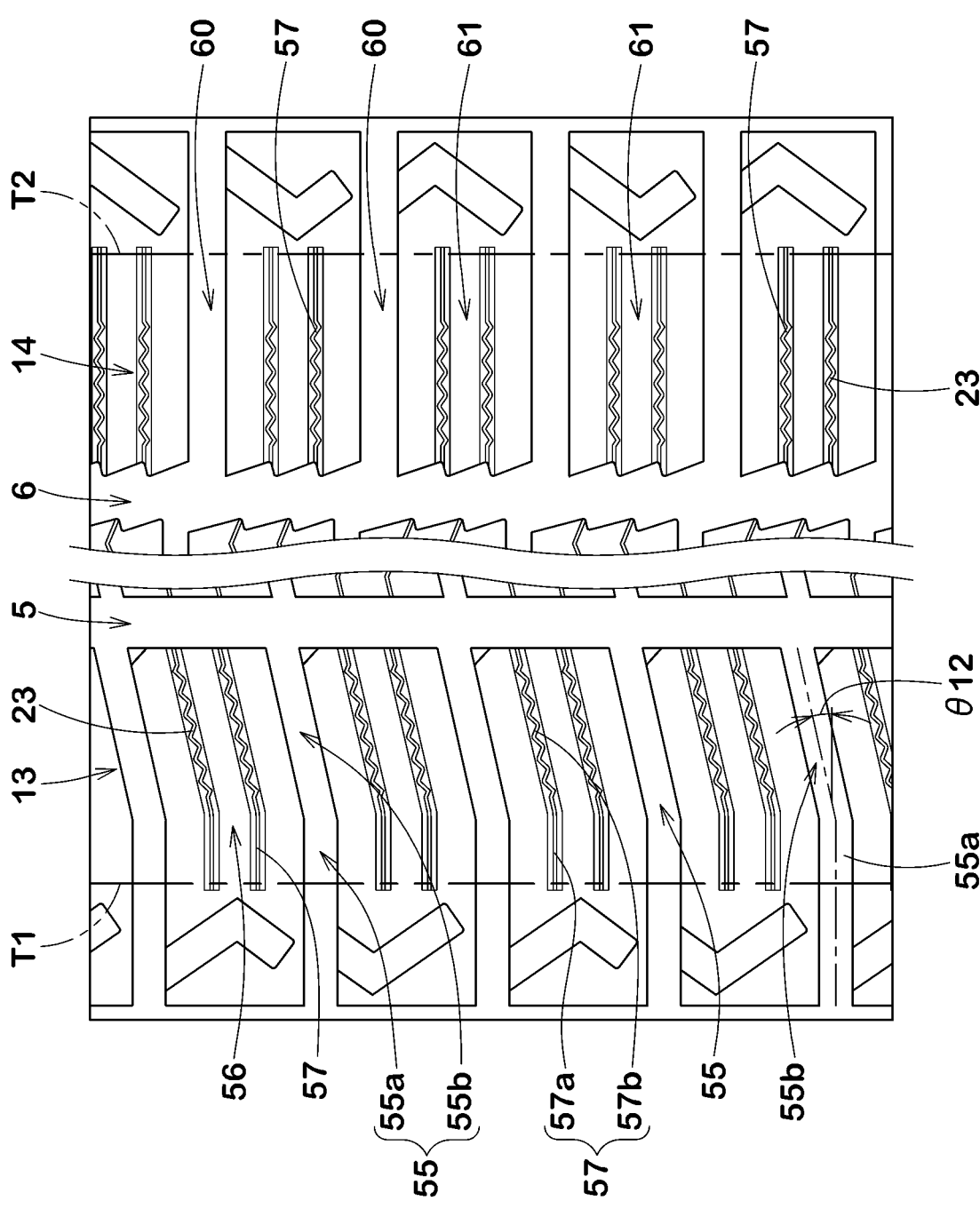
FIG. 19 is an enlarged view of the first shoulder land region and a second shoulder land region.

FIG. 19 shows an enlarged view of the first shoulder land region 13 and the second shoulder land region 14. It should be noted that the other land regions between the first shoulder land region 13 and the second shoulder land region 14 are omitted in FIG. 19. As shown in FIG. 19, the first shoulder land region 13 is a block row including a plurality of the first shoulder blocks 56 separated by a plurality of the first shoulder axial grooves 55.

Each of the first shoulder axial grooves 55 includes (consists of in this embodiment) the first groove portion (55*a*) and the second groove portion (55*b*) located on the axially inner side of the first groove portion, for example. The second groove portion (55*b*) extends from the first shoulder circumferential groove 5 to the first groove portion (55*a*), for example. The first groove portion (55*a*) extends axially outward from the second groove portion (55*b*) so as to cross the first tread edge T1, for example. The first groove portion (55*a*) has an angle of 10 degrees or less with respect to the tire axial direction. The second groove portion (55*b*) is inclined at an angle larger than the first groove portion (55*a*) with respect to the tire axial direction. The second groove portion (55*b*) has the angle θ12 in the range from 10 to 20 degrees with respect to the tire axial direction, for example.

Each of the first shoulder blocks 56 is provided with a plurality of the shoulder axial sipes 57. As mentioned above, all of the shoulder axial sipes 57 are configured as the chamfered sipes 23. The shoulder axial sipes 57 extend from the first shoulder circumferential groove 5 to the first tread edge T1. Each of the shoulder axial sipes 57 includes the first sipe portion (57*a*) extending linearly in parallel with the first groove portions (55*a*) of the first shoulder axial grooves 55, and the second sipe portion (57*b*) extending obliquely in a zigzag shape to the same side as the second groove portions (55*b*) of the first shoulder axial grooves 55. In a preferred embodiment, the first sipe portion (57*a*) extends linearly in the tire radial direction in a cross section thereof. On the other hand, the second sipe portion (57*b*) is configured as a so-called 3D sipe extending in a zigzag shape also in the tire radial direction in a cross section thereof. The shoulder axial sipes 57 configured as such can improve the on-snow performance while maintaining the rigidity of the first shoulder blocks 56.

The second shoulder land region 14 is a block row including a plurality of the second shoulder blocks 61 separated by a plurality of the second shoulder axial grooves 60. The second shoulder blocks 61 are provided with the shoulder axial sipes 57 similar to those in the first shoulder blocks 56. The above-described configurations can be applied to these sipes.

As shown in FIG. 14, it is preferred that the land ratio in the region from the first tread edge T1 to the tire equator (C) is greater than the land ratio in the region from the second tread edge T2 to the tire equator (C). Therefore, the steering stability on a dry road surface can be improved. It should be noted that the land ratio corresponds to the ratio of the actual ground contact area to the virtual ground contact area in a state where all the grooves and the sipes in the concerned region are filled.

While detailed description has been made of the tire according to embodiments of the present disclosure, the present disclosure can be embodied in various forms without being limited to the illustrated embodiments.

EXAMPLES

As tires in Examples, pneumatic tires of size 215/55R17 having the basic pattern shown in FIG. 1 were made by way of test. As tires in Reference, pneumatic tires having the tread portion shown in FIG. 20 were made by way of test. In the tires in the Reference, a groove wall (b) of groove walls of a second shoulder circumferential groove (a) was configured as a flat surface instead of a zigzag surface. That is to say that the groove wall (b) which is one of the groove walls of the second shoulder circumferential groove (a) extends linearly in the tire circumferential direction whereas the other groove wall of the second shoulder circumferential groove (a) extends in a zigzag manner in the tire circumferential direction. The tire in the Reference had substantially the same configuration as the tires in the Examples except for the above-described matters.

The tires in the Reference and the Examples were tested for the steering stability on a dry road surface and the running performance on a snowy road surface. The common specification of the test tires and the test methods were as follows.

tire rim: 17×7.5 J

Tire inner pressure: 240 kPa on all wheels

Test vehicle: front wheel drive car with displacement of 2500 cc

Tire mounting position: all wheels

<Steering Stability on Dry Road Surface>

While a test driver drove the above test vehicle on a dry road surface, the steering stability was evaluated based on the driver's sensory perception. The results are indicated by an evaluation point, wherein the larger the numerical value, the better the steering stability is.

<Running Performance on Snowy Road Surface>

While the test driver drove the above test vehicle on a snowy road surface, the running performance was evaluated based on the driver's sensory perception. The results are indicated by an evaluation point, wherein the larger the numerical value, the better the running performance is.

The test results are shown in Table 1.

TABLE 1

Figure 20:
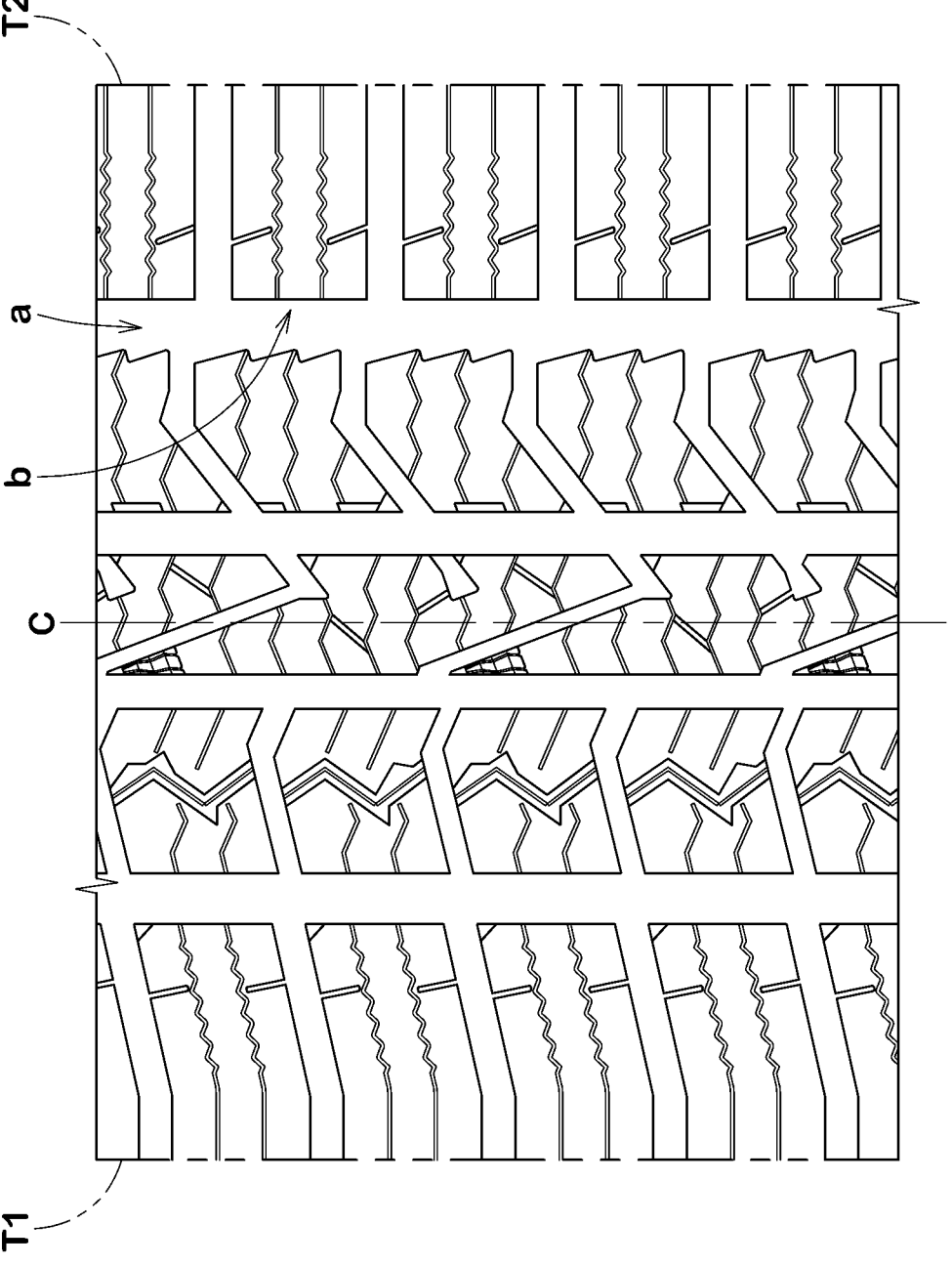
FIG. 20 is a development view of the tread portion of a tire in Reference.

|  | Reference | Ex. 1 | Ex. 2 | Ex. 3 |
|---|---|---|---|---|
| Figure showing Tread portion | FIG. 20 | FIG. 1 | FIG. 1 | FIG. 1 |
| Angle θ1 of First surface with respect to Tire axial direction [degree] | 70 | 70 | 70 | 70 |
| Angle θ2 of Second surface with respect to Tire axial direction [degree] | 20 | 20 | 5 | 40 |
| Steering stability on Dry road surface [evaluation point] | 95 | 105 | 100 | 105 |
| Running performance on Snowy road surface [evaluation point] | 90 | 100 | 100 | 95 |

As shown in Table 1, the tires in the Reference have the steering stability on a dry road surface of 95 points, whereas the tires in the Examples 1 to 3 have the significantly improved steering stability of 100 to 105 points. On the other hand, the tires in the Reference have the running performance on a snowy road surface of 90 points, whereas the tires in the Examples 1 to 3 have the running performance of 95 to 100 points. That is to say, the test results confirmed that the tires in the Examples improved the steering stability on a dry road surface while maintaining the running performance on a snowy road surface.

STATEMENT OF DISCLOSURE

The present disclosure includes the following aspects.

Present Disclosure 1

A tire including a tread portion, wherein the tread portion position for mounting the tire on a vehicle is specified regarding inner and outer sides of the tread portion with respect to the vehicle, wherein the tread portion includes:

a first tread edge specified to be positioned on the outer side of the vehicle;

a second tread edge specified to be positioned on the inner side of the vehicle; and a plurality of circumferential grooves each extending continuously in a tire circumferential direction, wherein the circumferential grooves include:

a first shoulder circumferential groove positioned closest to the first tread edge among the circumferential grooves;

a first crown circumferential groove positioned between the first shoulder circumferential groove and a tire equator;

a second shoulder circumferential groove positioned closest to the second tread edge among the circumferential grooves; and a second crown circumferential groove positioned between the tire equator and the second shoulder circumferential groove, wherein the tread portion has five land regions separated by the first shoulder circumferential groove, the first crown circumferential groove, the second shoulder circumferential groove, and the second crown circumferential groove, each of groove walls on both sides of the second shoulder circumferential groove is configured as a zigzag surface so that the cross section of the second shoulder circumferential groove repeats displacement in a tire axial direction along the tire circumferential direction, groove walls on both sides of the second crown circumferential groove are configured as flat surfaces extending parallel to each other in the tire circumferential direction so that the cross sections of the second crown circumferential groove are not displaced in the tire axial direction, each of the groove walls of the second shoulder circumferential groove is divided in the tire circumferential direction by a plurality of axial grooves, each of the groove walls of the second shoulder circumferential groove includes first surfaces and second surfaces arranged alternately in the tire circumferential direction, the second surfaces extending in a direction different from the first surfaces, and each of the groove walls of the second shoulder circumferential groove has 2 to 4 first surfaces between each two of the axial grooves adjacent to each other in the tire circumferential direction.

Present Disclosure 2

The tire according to Present Disclosure 1, wherein each of the first surfaces has an angle from 65 to 75 degrees with respect to the tire axial direction.

Present Disclosure 3

The tire according to Present Disclosure 2, wherein each of the second surfaces has an angle from 15 to 25 degrees with respect to the tire axial direction.

Present Disclosure 4

The tire according to Present Disclosure 1, wherein each of the first surfaces has a length in a direction along the second shoulder circumferential groove from 70% to 80% of a groove width of the second shoulder circumferential groove.

Present Disclosure 5

The tire according to Present Disclosure 1, wherein the second shoulder circumferential groove has a groove width larger than a groove width of the second crown circumferential groove.

Present Disclosure 6

The tire according to Present Disclosure 5, wherein the groove width of the second shoulder circumferential groove is from 105% to 110% of the groove width of the second crown circumferential groove.

Present Disclosure 7

The tire according to Present Disclosure 1, wherein the second crown circumferential groove has a depth in the range from 100% to 105% of a depth of the second shoulder circumferential groove.

Present Disclosure 8

The tire according to Present Disclosure 1, wherein the five land regions include a first middle land region demarcated between the first shoulder circumferential groove and the first crown circumferential groove, the first middle land region is provided with a plurality of first middle axial grooves each extending from the first shoulder circumferential groove to the first crown circumferential groove, and each of the first middle axial grooves includes a first groove portion extending obliquely with respect to the tire axial direction and a second groove portion extending obliquely to a side opposite to the first groove portion of the each of the first middle axial grooves with respect to the tire axial direction.

Present Disclosure 9

The tire according to Present Disclosure 8, wherein an intersection of groove center lines of the first groove portion and the second groove portion in each of the each of the first middle axial grooves is located closer to the tire equator than an axial center position of the first middle land region is.

Present Disclosure 10

The tire according to Present Disclosure 1, wherein groove walls on both sides of the first crown circumferential groove are configured as flat surfaces extending parallel to each other in the tire circumferential direction so that the cross sections of the first crown circumferential groove are not displaced in the tire axial direction.

Present Disclosure 11

The tire according to Present Disclosure 10, wherein groove walls on both sides of the first shoulder circumferential groove are configured as flat surfaces extending parallel to each other in the tire circumferential direction so that the cross sections of the first shoulder circumferential groove are not displaced in the tire axial direction.

Present Disclosure 12

The tire according to Present Disclosure 1, wherein
the axial grooves include a plurality of second middle axial grooves each extending from the second shoulder circumferential groove to the second crown circumferential groove, and plurality of second shoulder axial grooves each extending from the second shoulder circumferential groove to the second tread edge, and end portions on the second shoulder circumferential groove side of the second middle axial grooves are misaligned in the tire circumferential direction with respect to end portions on the second shoulder circumferential groove side of the second shoulder axial grooves.

Present Disclosure 13

The tire according to Present Disclosure 1, wherein
the axial grooves include a plurality of second middle axial grooves each extending from the second shoulder circumferential groove to the second crown circumferential groove, and each of the second middle axial grooves includes a first groove portion communicating with the second crown circumferential groove and extending obliquely with respect to the tire axial direction, and a second groove portion communicating with the second shoulder circumferential groove and extending at an angle smaller than the first groove portion of the each of the second middle axial grooves with respect to the tire axial direction.

Present Disclosure 14

The tire according to Present Disclosure 13, wherein
the five land regions include a crown land region demarcated between the first crown circumferential groove and the second crown circumferential groove, the crown land region is provided with a plurality of crown axial grooves each extending from the first crown circumferential groove to the second crown circumferential groove, and each of the crown axial grooves includes a first groove portion communicating with the first crown circumferential groove and extending obliquely with respect to the tire axial groove, and a second groove portion communicating with the second crown circumferential groove and extending obliquely to a side opposite to the first groove portion of the each of the crown axial grooves with respect to the tire axial direction.

Present Disclosure 15

The tire according to Present Disclosure 14, wherein, in each pair of one of the crown axial grooves and one of the second middle axial grooves immediately adjacent to each other, the second groove portion of the crown axial groove overlaps with a virtual region obtained by extending the first groove portion, in a length direction thereof, of the second middle axial groove.

Present Disclosure 16

The tire according to Present Disclosure 1, wherein the first crown circumferential groove has a groove width smaller than a groove width of the second shoulder circumferential groove and a groove width of the second crown circumferential groove.

Present Disclosure 17

The tire according to Present Disclosure 1, wherein the first shoulder circumferential groove has a groove width larger than a groove width of the first crown circumferential groove and a groove width of the second crown circumferential groove.

Present Disclosure 18

The tire according to Present Disclosure 1, wherein the five land regions include a first shoulder land region including the first tread edge, a second shoulder land region including the second tread edge, and at least one other land region located between the first shoulder land region and the second shoulder land region, each of the five land regions is a block row including a plurality of blocks separated by a plurality of axial grooves each extending in the tire axial direction, each of the blocks is provided with a plurality of sipes, the sipes include chamfered sipes and/or non-chamfered sipes, each of the chamfered sipes has a chamfered portion formed on at least one of edges on both sides of the each of the chamfered sipes, each of the non-chamfered sipes has no chamfered portions formed on either one of the edges on both sides of the each of the non-chamfered sipes, the first shoulder land region has a chamfered sipe ratio greater than a chamfered sipe ratio of the at least one other land region, and the chamfered sipe ratio is a ratio of the total length of the chamfered sipes to the total length of the sipes for each of the land regions.

Present Disclosure 19

The tire according to Present Disclosure 18, wherein the second shoulder land region has a chamfered sipe ratio greater than the chamfered sipe ratio of the at least one other land region.

Present Disclosure 20

The tire according to Present Disclosure 18, wherein the at least one other land region is a first middle land region adjacent immediately to the first shoulder land region, the blocks include a plurality of first middle blocks provided in the first middle land region, the sipes include circumferential sipes extending in the tire circumferential direction in the first middle blocks, and the circumferential sipes include the chamfered sipes.

DESCRIPTION OF REFERENCE SIGNS 2 tread portion
3 circumferential groove
4 land region
5 first shoulder circumferential groove
6 second shoulder circumferential groove
7 first crown circumferential groove
8 second crown circumferential groove
21s first surface
22s second surface
T1 first tread edge
T2 second tread edge

The invention claimed is:

1. A tire comprising a tread portion,
wherein the tread portion has a tread portion position for mounting the tire on a vehicle, the tread portion position being an inner side or an outer side of the tire with respect to the vehicle,
the tread portion comprises:
    a first tread edge positioned on the outer side of the vehicle;
    a second tread edge positioned on the inner side of the vehicle; and
    a plurality of circumferential grooves each extending continuously in a tire circumferential direction,
the circumferential grooves comprise:
    a first shoulder circumferential groove positioned closest to the first tread edge among the circumferential grooves;
    a first crown circumferential groove positioned between the first shoulder circumferential groove and a tire equator;
    a second shoulder circumferential groove positioned closest to the second tread edge among the circumferential grooves; and
    a second crown circumferential groove positioned between the tire equator and the second shoulder circumferential groove,
the tread portion has five land regions separated by the first shoulder circumferential groove, the first crown circumferential groove, the second shoulder circumferential groove, and the second crown circumferential groove,
each of groove walls on both sides of the second shoulder circumferential groove is a zigzag surface so that a cross section of the second shoulder circumferential groove repeats displacement in a tire axial direction along the tire circumferential direction,
groove walls on both sides of the second crown circumferential groove are flat surfaces extending parallel to each other in the tire circumferential direction so that cross sections of the second crown circumferential groove are not displaced in the tire axial direction,
each of the groove walls of the second shoulder circumferential groove is divided in the tire circumferential direction by a plurality of axial grooves,
each of the groove walls of the second shoulder circumferential groove includes first surfaces and second surfaces arranged alternately in the tire circumferential direction, the second surfaces extending in a direction different from the first surfaces,
each of the groove walls of the second shoulder circumferential groove has 2 to 4 first surfaces between each two of the axial grooves adjacent to each other in the tire circumferential direction, and
each of the first surfaces has an angle from 65 to 75 degrees with respect to the tire axial direction.

2. The tire according to claim 1, wherein each of the second surfaces has an angle from 15 to 25 degrees with respect to the tire axial direction.

3. The tire according to claim 1, wherein each of the first surfaces has a length in a direction along the second shoulder circumferential groove from 70% to 80% of a groove width of the second shoulder circumferential groove.

4. The tire according to claim 1, wherein the second crown circumferential groove has a depth in a range from 100% to 105% of a depth of the second shoulder circumferential groove.

5. The tire according to claim 1, wherein the axial grooves include a plurality of second middle axial grooves each extending from the second shoulder circumferential groove to the second crown circumferential groove, and a plurality of second shoulder axial grooves each extending from the second shoulder circumferential groove to the second tread edge, and end portions on a second shoulder circumferential groove side of the second middle axial grooves are misaligned in the tire circumferential direction with respect to end portions on the second shoulder circumferential groove side of the second shoulder axial grooves.

6. The tire according to claim 1, wherein the first crown circumferential groove has a groove width smaller than a groove width of the second shoulder circumferential groove and a groove width of the second crown circumferential groove.

7. The tire according to claim 1, wherein the first shoulder circumferential groove has a groove width larger than a groove width of the first crown circumferential groove and a groove width of the second crown circumferential groove.

8. The tire according to claim 1, wherein the second shoulder circumferential groove has a groove width larger than a groove width of the second crown circumferential groove.

9. The tire according to claim 8, wherein the groove width of the second shoulder circumferential groove is from 105% to 110% of the groove width of the second crown circumferential groove.

10. The tire according to claim 1, wherein the five land regions include a first middle land region between the first shoulder circumferential groove and the first crown circumferential groove, the first middle land region is provided with a plurality of first middle axial grooves each extending from the first shoulder circumferential groove to the first crown circumferential groove, and each of the first middle axial grooves includes a first groove portion extending obliquely with respect to the tire axial direction and a second groove portion extending obliquely to a side opposite to the first groove portion of the respective first middle axial groove with respect to the tire axial direction.

11. The tire according to claim 10, wherein an intersection of groove center lines of the first groove portion and the second groove portion in each of the first middle axial grooves is located closer to the tire equator than an axial center position of the first middle land region.

12. The tire according to claim 1, wherein groove walls on both sides of the first crown circumferential groove are flat surfaces extending parallel to each other in the tire circumferential direction so that cross sections of the first crown circumferential groove are not displaced in the tire axial direction.

13. The tire according to claim 1, wherein groove walls on both sides of the first shoulder circumferential groove are flat surfaces extending parallel to each other in the tire circumferential direction so that cross sections of the first shoulder circumferential groove are not displaced in the tire axial direction.

14. The tire according to claim 1, wherein the five land regions include a first shoulder land region including the first tread edge, a second shoulder land region including the second tread edge, and at least one other land region located between the first shoulder land region and the second shoulder land region, each of the five land regions is a block row including a plurality of blocks separated by a plurality of axial grooves each extending in the tire axial direction, each of the blocks is provided with a plurality of sipes, the sipes include at least one of (i) chamfered sipes having a chamfered portion formed on at least one of edges on both sides of the each of the chamfered sipes, and (ii) non-chamfered sipes having no chamfered portions formed on either one of the edges on both sides of the each of the non-chamfered sipes, and with the proviso that, when the sipes include the chamfered sipes, the first shoulder land region has a chamfered sipe ratio greater than a chamfered sipe ratio of the at least one other land region, and the chamfered sipe ratio is a ratio of a total length of the chamfered sipes to a total length of the sipes for each of the land regions.

15. The tire according to claim 14, wherein the second shoulder land region has a chamfered sipe ratio greater than the chamfered sipe ratio of the at least one other land region.

16. The tire according to claim 14, wherein the at least one other land region is a first middle land region adjacent immediately to the first shoulder land region, the blocks include a plurality of first middle blocks provided in the first middle land region, the sipes include circumferential sipes extending in the tire circumferential direction in the first middle blocks, and the circumferential sipes include the chamfered sipes.

17. The tire according to claim 1, wherein the axial grooves include a plurality of second middle axial grooves each extending from the second shoulder circumferential groove to the second crown circumferential groove, and each of the second middle axial grooves includes a first groove portion communicating with the second crown circumferential groove and extending obliquely with respect to the tire axial direction, and a second groove portion communicating with the second shoulder circumferential groove and extending at an angle smaller than the first groove portion of the each of the second middle axial grooves with respect to the tire axial direction.

18. The tire according to claim 17, wherein the five land regions include a crown land region between the first crown circumferential groove and the second crown circumferential groove, the crown land region is provided with a plurality of crown axial grooves each extending from the first crown circumferential groove to the second crown circumferential groove, and each of the crown axial grooves includes a first groove portion communicating with the first crown circumferential groove and extending obliquely with respect to a tire axial groove, and a second groove portion communicating with the second crown circumferential groove and extending obliquely to a side opposite to the first groove portion of the each of the crown axial grooves with respect to the tire axial direction.

19. The tire according to claim 18, wherein, in each pair of one of the crown axial grooves and one of the second middle axial grooves immediately adjacent to each other, the second groove portion of the crown axial groove overlaps with a virtual region obtained by extending the first groove portion, in a length direction thereof, of the second middle axial groove.

\* \* \* \* \*